United States Patent
Harty, Jr. et al.

(10) Patent No.: US 12,527,299 B2
(45) Date of Patent: Jan. 20, 2026

(54) METHOD AND APPARATUS FOR DETERMINING THE IDENTITY OF AN ANIMAL OF A HERD OF ANIMALS

(71) Applicant: DAIRYMASTER, County Kerry (IE)

(72) Inventors: Edmond Patrick Harty, Jr., County Kerry (IE); Shane Joseph Burns, County Sligo (IE); Alan Hanley, County Limerick (IE); John Gerard Daly, County Kerry (IE); Liam Mullane, County Limerick (IE); Niall O'Mahony, County Kerry (IE); Joseph Walsh, County Kerry (IE); Daniel Riordan, County Kerry (IE)

(73) Assignee: DAIRYMASTER, County Kerry (IE)

( * ) Notice: Subject to any disclaimer, the term of this patent is extended or adjusted under 35 U.S.C. 154(b) by 978 days.

(21) Appl. No.: 17/636,462

(22) PCT Filed: Aug. 21, 2020

(86) PCT No.: PCT/EP2020/073575
§ 371 (c)(1),
(2) Date: Feb. 18, 2022

(87) PCT Pub. No.: WO2021/032890
PCT Pub. Date: Feb. 25, 2021

(65) Prior Publication Data
US 2022/0284725 A1    Sep. 8, 2022

(30) Foreign Application Priority Data
Aug. 21, 2019   (IE) .................................. S2019/0142

(51) Int. Cl.
*A01K 11/00* (2006.01)
*A01J 5/01* (2006.01)
(Continued)

(52) U.S. Cl.
CPC ............... *A01K 11/006* (2013.01); *A01J 5/01* (2013.01); *A01J 5/0131* (2013.01); *A01K 1/126* (2013.01);
(Continued)

(58) Field of Classification Search
CPC ........ A01K 11/006; A01K 1/12; G06V 40/10; G06V 10/74; G06V 10/764; G06T 7/0012; A61B 2503/40
See application file for complete search history.

(56) References Cited

U.S. PATENT DOCUMENTS

2006/0180093 A1* 8/2006 Cross .................. A01K 11/008
119/720
2006/0260939 A1* 11/2006 Anderson .............. G01N 33/04
204/403.01
(Continued)

FOREIGN PATENT DOCUMENTS

| EP | 3316680 A1 | 5/2018 |
| SE | 1800191 A1 | 7/2019 |

OTHER PUBLICATIONS

Luca Bergamini et al., "Multi-views Embedding for Cattle Re-identification", 2018 14th International Conference on Signal-Image Technology & Internet-Based Systems (SITIS), 2018, pp. 184-191, IEEE.
(Continued)

*Primary Examiner* — Margaret G Webb
(74) *Attorney, Agent, or Firm* — Sughrue Mion, PLLC

(57) ABSTRACT

A rotary milking platform (3) comprises a plurality of stalls (5) and an RFID animal identifying system (9) for identifying animals entering the stalls (5) of the platform (3). A microprocessor (14) reads signals from an image capturing device (15) and computes a feature vector from the captured image of each animal. A plurality of reference feature vectors comprising respective matrices of metrics already
(Continued)

Figure 1:
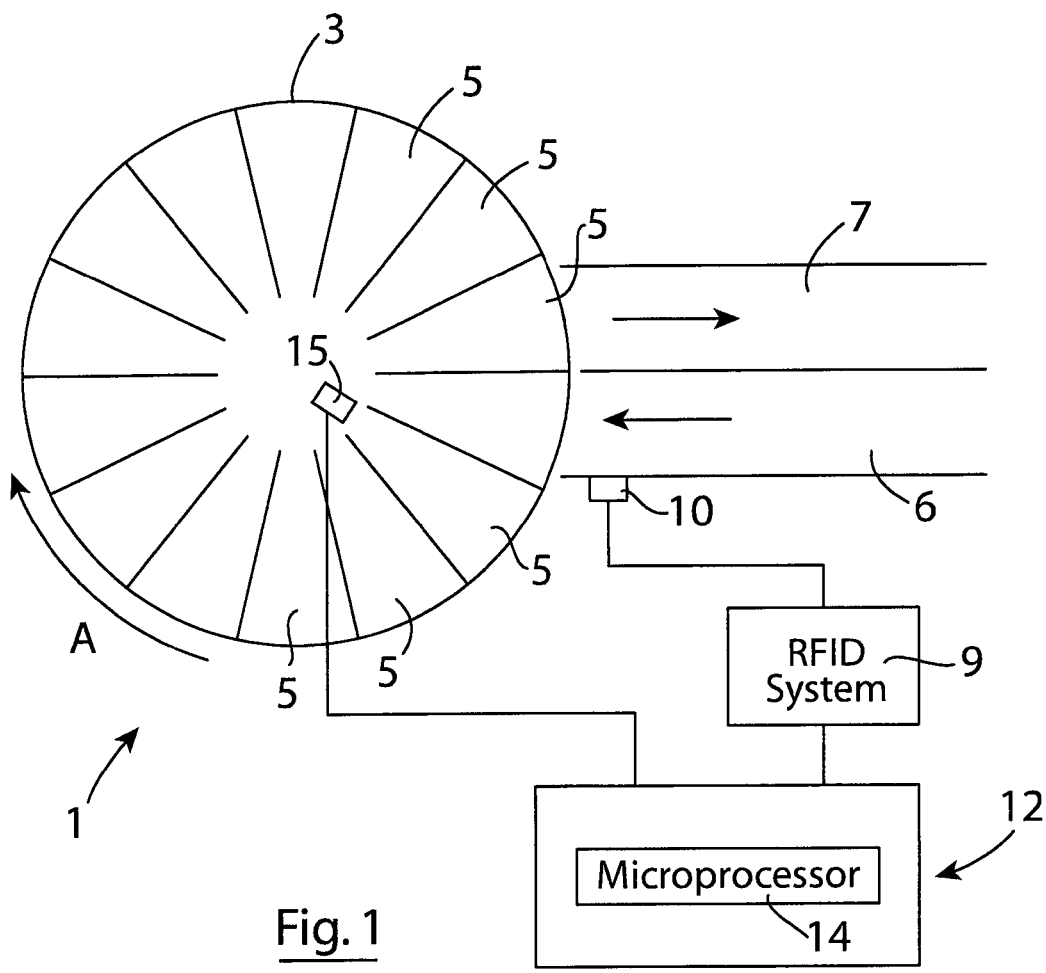

derived from images of the respective animals captured by the image capturing device (15) are stored and cross-referenced with the identity of the respective animals. The microprocessor (14) compares computed feature vectors of each animal with the stored reference feature vectors until a best match has been determined with one of the reference feature vectors. The identity of the animal of that matching reference feature vector is then determined as the identity of the animal of that computed feature vector. The determined identity of the animal in the relevant stall (5) is compared with the identity of the animal determined for that stall (5) by the RFID system (9). On a favourable comparison the identity of the animal determined from the captured image of that animal is confirmed as the identity of the animal. In the event of a conflict between the two identities being determined, a conflict alert signal is produced.

20 Claims, 4 Drawing Sheets

(51) Int. Cl.
*A01J 5/013* (2006.01)
*A01K 1/12* (2006.01)
*A01K 29/00* (2006.01)
*G06K 7/10* (2006.01)
*G06T 7/00* (2017.01)
*G06V 10/40* (2022.01)
*G06V 10/74* (2022.01)
*G06V 10/764* (2022.01)
*G06V 10/772* (2022.01)
*G06V 40/10* (2022.01)

(52) U.S. Cl.
CPC .......... *A01K 29/00* (2013.01); *G06K 7/10366* (2013.01); *G06T 7/0012* (2013.01); *G06V 10/40* (2022.01); *G06V 10/74* (2022.01); *G06V 10/764* (2022.01); *G06V 10/772* (2022.01); *G06V 40/10* (2022.01)

(56) References Cited

U.S. PATENT DOCUMENTS

| | | | |
|---|---|---|---|
| 2014/0158065 A1* | 6/2014 | Axelson | A01K 1/0029 119/843 |
| 2015/0181836 A1 | 7/2015 | Obermuller | |
| 2015/0351885 A1* | 12/2015 | Kool | A61B 5/1118 600/551 |
| 2018/0082016 A1* | 3/2018 | Moshier | A01K 11/006 |
| 2019/0254249 A1* | 8/2019 | Caamaño Fernandez | A01J 5/0138 |
| 2020/0143157 A1 | 5/2020 | Borchersen et al. | |

OTHER PUBLICATIONS

K. Zhao et al., "Automatic lameness detection in dairy cattle based on leg swing analysis with an image processing technique", Computers and Electronics in Agriculture, 2018, pp. 226-236, vol. 148.

X. Song et al., "Automated body condition scoring of dairy cows using 3-dimensional feature extraction from multiple body regions", Journal of Dairy Science, 2019, 2019, pp. 4294-4308, vol. 102, No. 5.

J. Rodriguez Alvarez Juan et al., "Body condition estimation on cows from depth images using Convoluti onal Neural Networks", Computers and Electronics in Agriculture, 2018, pp. 12-22, vol. 155.

International Search Report of PCT/EP2020/073575 dated Mar. 12, 2021 [PCT/ISA/210].

Written Opinion of PCT/EP2020/073575 dated Mar. 12, 2021 [PCT/ISA/237].

* cited by examiner

METHOD AND APPARATUS FOR DETERMINING THE IDENTITY OF AN ANIMAL OF A HERD OF ANIMALS

CROSS REFERENCE TO RELATED APPLICATIONS

This application is a National Stage of International Application No. PCT/EP2020/073575 filed on Aug. 21, 2020, claiming priority based on Irish Patent Application No. S2019/0142 filed on Aug. 21, 2019.

The present invention relates to a method and apparatus for determining the identity of an animal of a herd of animals, and in particular, although not limited to a method and apparatus for determining the identity of an animal, for example, a cow, a goat or the like of a herd of such animals in or entering a milking parlour, in or entering a stall of a rotary milking platform, or in or entering a stall of a single stall milking apparatus.

It is important that the identity of each animal in a stall of a milking parlour, for example, a rotary milking platform is identified, so that the milk yield and other aspects of milk produced by that animal can be individually determined. Additionally, since animals are regularly fed during milking in a stall of a milking parlour, it is also important that where animals are fed by an automatic feeding system that the identity of each animal in the stalls of a milking parlour can be correctly identified, so that the correct diet feed and the correct amount of diet feed is supplied to the animal during each milking cycle.

While there are various systems for determining the identity of an animal, for example, RFID animal identification systems, for various reasons the accuracy with which the identity of the animals in the respective stalls of a milking parlour or a rotary milking platform is determined is not always correct.

There is therefore a need for a method which addresses this problem, and there is also a need for an apparatus to address this problem.

The present invention is directed towards providing a method and an apparatus for addressing the problem.

According to the invention there is provided a method for determining the identities of animals of a herd of animals, the method comprising capturing an image of at least a part of the animal with an image capturing device, comparing the captured image or a feature vector computed from the captured image with a plurality of stored reference images or stored reference feature vectors of the respective animals of the herd cross-referenced with the identities of the animals until a best match is detected matching the captured image with one of the reference images, or matching the computed feature vector with one of the reference feature vectors, and determining the identity of the animal based on the best match.

In one embodiment of the invention the reference images of the respective animals are stored in electronic form, and the captured image is compared sequentially with each of the reference images until the best match has been identified.

In one embodiment of the invention more than one image of each animal is captured, and the more than one captured images of that animal are compared with the reference images until a best match is identified.

In another aspect of the invention a plurality of reference images of each one of the respective animals is stored in electronic form, and the captured image is compared using a statistical sampling best match method with the reference images sequentially until the best match has been identified.

In one embodiment of the invention each reference image comprises a two-dimensional image of the corresponding animal.

In another embodiment of the invention each reference image comprises a three-dimensional image of the corresponding animal.

In a further embodiment of the invention each captured image comprises a two-dimensional image of the animal captured in the image, and in another embodiment of the invention each captured image comprises a three-dimensional image of the animal captured in the image.

Preferably, the reference images of the respective animal are reference images of approximately similar parts of the animals. Preferably, each captured image comprises a part of the corresponding animal.

Preferably, the reference images of each corresponding animal are reference images of approximately similar parts of the corresponding animals.

In one aspect of the invention the one or more reference images of each corresponding animal are updated each time an image of the animal is captured and matched with the reference image or images of the corresponding animal.

In another aspect of the invention a previously captured image of each animal is stored in a reference image data file as a reference image of that animal, and preferably, each reference image data file is cross-referenced with the identity of the corresponding animal. Preferably, the comparing of the captured images with the reference images is carried out by a learning model configured in a computer, the captured images being passed through the learning model for comparison with the reference images in each reference image data file of each animal until a best match has been identified. Advantageously, the learning model comprises a deep learning model.

In one embodiment of the invention a characteristic of the captured image of each animal is compared with corresponding characteristics of the reference images of the respective animals until a best match has been identified.

Preferably, each reference image is stored in electronic form.

In another embodiment of the invention the method further comprises independently determining the identity of the respective animals of the herd by an independent identifying system.

Preferably, the independent identifying system comprises an electronic based identifying system. Advantageously, the independent identifying system is based on a radio frequency based identifying system. Ideally, the independent identifying system is configured for reading an electronically readable identifying code stored in or on the animal. Preferably, the identifying code is electronically stored in an electronic medium.

In one embodiment of the invention each animal of the herd is provided with a storing device for storing the animal identifying code.

In one embodiment of the invention the identity of each animal identified from the comparison of the captured image with the reference image of that animal is compared with the identity determined for that animal by the independent identifying system, and if the two determined identities are of the same animal, storing that captured image of that animal as a confirmed reference image of that animal. Preferably, if the identity of the one of the animals identified by the comparison of the captured image with the reference image for that animal is different to the identity determined by the independent identifying system for that animal, a conflict alert signal is produced, alerting to the conflict between the two determined identities of that animal.

In one embodiment of the invention the feature vector of each animal is computed from a number of captured images of that animal.

Preferably, the reference feature vectors for the respective animals of the herd are unique to each one of the respective animals.

Preferably, the reference feature vectors are stored in a data set comprising the reference feature vectors of the respective animals of the herd.

In one embodiment of the invention the reference feature vector of each animal comprises at least one metric relevant to that animal.

Preferably, the at least one metric relevant to each animal comprises a metric of an element derived from a reference image of that animal. Advantageously, the at least one metric relevant to each animal comprises a metric of the element computed from the reference image of that animal.

Advantageously, the reference feature vector of each animal comprises a matrix comprising a plurality of metrics of that animal.

Preferably, each metric of the matrix of metrics of each animal is computed from the reference image or images of that animal.

Advantageously, each reference image or images are stored in digital form, and each metric of each animal is computed from the digital form of the reference image of that animal.

In another embodiment of the invention the reference images of the respective animals of the herd comprise images of similar parts of the respective animals.

In one embodiment of the invention the identity of each animal identified from the comparison of the computed feature vector with the reference feature vector of that animal is compared with the identity determined for that animal by the independent identifying system, and if the two determined identities are of the same animal, storing that computed feature vector of that animal as a confirmed reference feature vector for that animal.

Preferably, if the identity of the one of the animals identified by the comparison of the computed feature vector with the reference feature vector for that animal is different to the identity determined by the independent identifying system for that animal, a conflict alert signal is produced alerting to the conflict between the two determined identities for that animal.

In another embodiment of the invention the reference feature vectors of groups of the animals of the herd are classified into respective classification groups of reference feature vectors, whereby at least one metric of the reference feature vector of each of the animals of each classification group comprise a metric of an element of the reference image of that animal of that classification group which is an element common to the reference images of the animals of that classification group.

Preferably, each reference feature vector of each classification group comprise more than one metric of one or more of the elements of the reference image from which that reference feature vector was computed, which is an element or are elements common to the reference images from which the reference feature vectors of that classification group were computed.

Advantageously, the reference feature vectors of each classification group comprise respective matrices of metrics of one or more of the elements common to the reference images from which the respective reference feature vectors of that classification group were computed.

Preferably, the reference images of the animals of the herd comprise images captured by an image capturing device.

Advantageously, the reference images of the animals of the herd comprise images of the respective animals captured by an image capturing device.

Preferably, the reference feature vector of each animal of the herd comprises a reference feature vector computed from the captured reference image of the corresponding animal.

In one embodiment of the invention the reference feature vectors of the respective animals of the herd are selected from reference images of the respective animals so that the metrics of the matrices of the metrics of the respective reference feature vectors are spaced apart sufficiently from each other so that the reference feature vectors of the respective animals are distinguishable from each other.

In another embodiment of the invention reference feature vectors of the respective animals are generated from the reference images of the respective animals by a metric learning model.

In another embodiment of the invention more than one reference feature vector is stored for each animal, the feature vector of each animal being computed from respective reference images of the animal.

Preferably, not more than a predefined number of reference feature vectors are stored for each animal.

Preferably, the reference image vector of each animal is updated each time a computed feature vector of a just captured image of that animal is matched with a reference feature vector of that animal, and the computed feature vector from the just computed image of that animal is stored as a reference feature vector of that animal with the other stored reference feature vectors of that animal.

Advantageously, each time the number of reference feature vectors stored for each animal exceeds the predefined number of stored feature vectors, the oldest stored reference feature vector which is not a confirmed reference feature vector is deleted from the stored reference feature vectors, and if all the reference feature vectors stored for that animal are confirmed reference feature vectors, the oldest one of the confirmed reference feature vector is deleted.

In another embodiment of the invention each time a match is not found for a computed feature vector computed from a just captured image of an animal, that computed feature vector is deemed to be a feature vector of a new animal, and is stored as a reference feature vector of the new animal, and a new animal alert signal is produced indicating that a new animal has been detected, and that the identity of the new animal is to be cross-referenced with the stored reference feature vector of that new animal.

In one embodiment of the invention on each computed feature vector being computed from a just captured image of an animal, the classification group of the reference feature vectors of the animals to which the computed feature vector is closest is determined, and the computed feature vector is compared with the reference feature vectors of that classification group until a best match of the computed feature vector with one of the reference feature vectors of that classification group is detected.

In another embodiment of the invention, if a best match of the computed feature vector computed from the just captured image with the reference feature vectors of the determined closest classification group of reference feature vectors is not identified, the computed feature vector is compared with the reference feature vectors of the other classification groups until a best match with one of the reference feature vectors is determined.

Preferably, each captured image is passed through a learning model, and the learning model computes the corresponding feature vector from the captured image.

Advantageously, the learning model comprises a one-shot deep learning model for permitting the creation and the inclusion of a new reference feature vector of a new animal added to the herd to be added to the learning model on the fly.

Preferably, the learning model is based on metric learning.

In one embodiment of the invention the metric learning model is configured to generate reference feature vectors of the respective animals of the herd in a feature space, such that the metrics are spaced apart sufficiently from each other in order to allow the reference feature vector of each animal to be distinguishable from the reference feature vectors of the respective other animals of the herd.

In another embodiment of the invention the computation with which the feature vectors for each captured image and the comparison thereof with the data set of the reference feature vectors of the herd is carried out by an neural network trained by a learning model configured in a signal processor. Advantageously, the learning model comprises a one-shot deep learning model which permits the creation and inclusion of additional reference feature vectors of corresponding animals added to the herd to be added to the learning model on the fly from one or only a few reference images. Preferably, the learning model is based on metric learning, and advantageously, is capable of distinguishing between the animals in the herd, so that each of the animals in the herd can be subsequently identified from the corresponding computed feature vector from captured images of that animal.

Preferably, the metric learning model is configured to generate reference feature vectors for the respective animals of the herd in a feature space such that all categories of metrics are spaced far enough away from each other that they allow the reference feature vector of each animal to be distinguishable from the reference feature vectors of the respective other animals of the herd.

The advantage of employing a metric learning model is that it permits a data set of reference feature vectors to be relatively rapidly computed and accumulated from a relatively small number of initial reference feature vectors computed from corresponding reference images. This is due to the ability of the metric learning model to compute reference feature vectors for new animals, each time an image of a new animal is captured so that the metrics of the feature vectors for the new animals are distinguishable from those of other animals, and once the feature vector of a new animal is computed, the feature vector for that animal is then stored with the data set of the reference feature vectors as reference feature vectors for that animal.

An advantage of providing the learning model based on metric learning over standard deep learning classifiers is that the initial data set required for a metric learning model is significantly less than that required for standard deep learning classifiers. Standard deep learning classifiers train from a large data set which would have to be collected over a long period of time and carefully managed to encompass a balance amount of varied data in order to learn the identity of each animal. By basing the learning model on metric learning, only one or a few reference images with feature vectors are required, and a data set of a plurality of reference feature vectors can be readily built up from the original one or a few reference images with feature vectors and from captured images of the respective animals.

In a further embodiment of the invention the learning model comprises comparing each feature vector that the model generates from the corresponding captured image with the matrix of the metrics of each of the reference feature vectors of all stored previously captured images of identified animals. In this embodiment of the invention previously captured feature vectors of each animal are stored in a data file as reference "fingerprints" or shortened data representations of each animal, and each data file is cross-referenced with the identity of the corresponding animal.

Preferably, the comparing of a feature vector computed from a captured image of one of the animals with the data set of the reference feature vectors for the herd is carried out by a distance function, which preferably, computes the distance between a pair of feature vectors in Euclidean space.

In one embodiment of the invention the feature vector computed from a captured image of an animal of the herd is passed through the learning model for comparison with the reference "fingerprint" feature vectors in each data file of each animal until an ordered list is generated of the identities of the animals, the reference feature vectors of which are closest to the computed feature vector. Preferably, the predicted identity of the animal is selected to be the animal with the reference feature vector in which the distance between a pair of feature vectors thereof is closest to the computed feature vector computed from a captured image and is within a certain predefined threshold distance.

In another embodiment of the invention the matrix of the metrics of the feature vector of that animal is updated by an inclusion prioritisation based on, for example, one of the number of captured images already available for that animal, the distance of the feature vector of the captured image of that animal from the reference feature vector of that animal stored in the data set of the reference feature vectors for the animals of the herd, and whether or not the identity of the animal was determined solely by the comparison of the feature vector computed from the captured image of the animal with the data set of the reference feature vectors of the animals of the herd, or was also confirmed by an independent identifying system.

In another embodiment of the invention reference feature vectors are deleted from the data set of the reference feature vectors of the animals of the herd by an exclusion prioritisation based, for example, on one of an expiry date, by specific data outlierness measures or closeness in Euclidian space to limit the storage requirements of the data set of the reference features of the animals of the herd, and to limit the computational time required for comparing each computed feature vector from each captured image with the reference feature vectors stored in the data set of the referenced feature vectors of the animals of the herd.

In another embodiment of the invention in the event of a discrepancy being determined between a predicted possible identity of an animal and the identity of that animal determined by an independent identifying system, or an animal not being successfully identified, provision is provided for permitting the inputting of the identity of that animal from an external source.

In one embodiment of the invention the external source may comprise a human machine interface, or a machine to machine interface where the identity of that animal would be inputted from a database of another system.

In a further embodiment of the invention the learning model is configured for use in conjunction with a herd of animals or a plurality of herds of animals, and in another embodiment of the invention the learning model is configured for constructing the data set of the reference feature vectors of the animals of one or more herds.

In another embodiment of the invention the learning model is configured to be carried out on a signal processor remotely or locally, for example, on a computer of a farmer having already the data set of captured images of animals of the herd cross-referenced with the identity of those animals.

In another embodiment of the invention the reference images of each animal are images of different parts of that animal.

In another embodiment of the invention the captured image of each animal comprises an image of an area of the animal less than the area of the corresponding reference image.

In a further embodiment of the invention at least some of the reference images of each animal comprise an image of one or more of the head, the ears, the rump, the shoulders and the tail of each animal.

Preferably, the captured image of each animal comprises an area of the animal similar to the area of the part of the animal of the reference image.

In another embodiment of the invention the captured image of the at least part of each animal comprises an area of the animal greater than the area of the part of the animal of the corresponding reference image.

In one embodiment of the invention at least one of the reference images of each of the animals represents a view of the corresponding animal when viewed from above.

In another embodiment of the invention at least one of the reference images of each of the animals represents a view of the corresponding animal when viewed from one side of the animal.

In another embodiment of the invention at least one of the reference images of each of the animals represents a view of the corresponding animal when viewed from both sides of the animal.

Preferably, at least one of the reference images of each of the animals represents a view of the corresponding animal when viewed from the front of the animal.

In another embodiment of the invention at least one of the reference images of each of the animals represents a view of the corresponding animal when viewed from the rear of the animal.

In another embodiment of the invention at least one of the reference images of each of the animals represents a view of the corresponding animal when viewed at an angle from above and from one of the front, the rear and one of the sides of the animal.

In another embodiment of the invention at least two reference images from different viewing points relative to the animal are stored for each animal.

In one embodiment of the invention the identity of the animal is determined by identifying from the captured image of that animal, the shape of at least a part of the animal and comparing the shape of that at least part of the animal with the shape of corresponding parts of the reference images of the respective animals.

In another embodiment of the invention at least one of the reference images of each animal comprises a distinctive feature of that animal.

Preferably, the distinctive feature of each animal comprises an inherent feature of that animal.

In another embodiment of the invention the distinctive feature of each animal comprises a distinctive feature applied to or attached to that animal.

Preferably, the distinctive feature applied to each animal comprises one of a distinctive graphical symbol, distinctive indicia, one or more identifying letters, one or more identifying numerals and an alphanumeric code.

In another embodiment of the invention the reference image of each animal comprises one or both of an inherent distinctive feature and a distinctive feature applied to or attached to the animal.

Preferably, the reference images are stored digitally.

Advantageously, the captured images and the reference images are captured by a digital image capturing device.

In one embodiment of the invention the images are captured by a digital video image capturing device.

In another embodiment of the invention the captured images and the reference images are captured by a charge coupled device.

In another embodiment of the invention the captured images and the reference images are captured by a CMOS device.

In a further embodiment of the invention the image capturing device comprises a photonic mixer device using CMOS technology.

In one embodiment of the invention the image capturing device is located above the animal adjacent the location at which the image of the animal is to be captured in order to produce an image looking downwardly from above the animal.

In another embodiment of the invention the captured image of each animal is captured adjacent a drafting crate configured for separating the animals.

In another embodiment of the invention the image capturing device is located adjacent a feeding station in which one or more of water and food for an animal is provided.

In another embodiment of the invention the image capturing device is located for capturing the image of the animal in or adjacent a stall of one of a milking parlour and a single stall milking apparatus.

In a further embodiment of the invention the image capturing device is located adjacent the stall towards one end of the stall.

Preferably, the determined identity of the animal is cross-referenced with the identification number of the stall in which the animal is located.

In another embodiment of the invention the milk yield from the stall in which the animal is located is monitored while the animal is in the stall and the quantity of milk produced by the animal during the period the animal is in the stall is computed and stored cross-referenced with the identity of the animal.

In one embodiment of the invention the independent identifying system is configured to determine the identity of the animal as the animal is entering the one of the milking parlour, the stall of the one of the milking parlour and the single stall milking apparatus.

In another embodiment of the invention, one or more of the milk yield, the milk composition, the milk let down and the milking time are monitored from each animal during each milking cycle and stored cross-referenced with the identity of the animal.

In a further embodiment of the invention health issues of each animal are identified from the milk monitored from the animal, and any identified adverse health issues of that animal are stored cross-referenced with the identity of the animal.

In a still further embodiment of the invention feed is supplied to each animal, and the feed supplied to the animal is monitored, and the weight of the feed consumed by the animal during each milking cycle is computed and stored cross-referenced with the identity of the animal.

In one embodiment of the invention at least one reference auxiliary characteristic of each animal of the herd is stored cross-referenced with the identity of the animal, and the method further comprises determining the identity of each animal by determining at least one auxiliary characteristic of that animal corresponding to the at least one stored reference auxiliary characteristic and comparing the at least one determined auxiliary characteristic with the stored reference auxiliary characteristics of the animals of the herd until a best match of the determined auxiliary characteristic with one of the reference auxiliary characteristics is found, and determining the identity of the animal as the identity of the animal of the matching reference auxiliary characteristic.

Preferably, each animal being identified, the one or more of the determined auxiliary characteristics is stored as the most recent one or more of the reference auxiliary characteristics for that animal cross-referenced with the identity of that animal.

Advantageously, no more than a predefined number of each one of the reference auxiliary characteristics is stored for each animal, and when the number of each one of the reference auxiliary characteristics stored for each animal has been reached, the oldest one of the corresponding reference auxiliary characteristics of that animal is deleted.

In another embodiment of the invention the reference auxiliary characteristics comprise one or more of a reference weight of seed consumed, a reference milk yield, a reference milk composition, a reference milk let down and a reference milking time of each of the respective animals of the herd, and the method further comprises determining one or more of the weight of feed consumed, the milk yield, the milk composition, the milk let down and the milking time of each animal during each milking cycle.

In another embodiment of the invention one of the reference auxiliary characteristics comprises at least one reference adverse health issue of each animal of the herd with an adverse health issue. Preferably, an adverse health issue is determined for each animal with an adverse health issue.

Advantageously, the adverse health issue is derived from each animal from one of the captured images of that animal or from the milk monitored from that animal.

In another embodiment of the invention one of the reference auxiliary characteristics comprises a reference lameness score of each animal of the herd. Preferably, a lameness score of each animal is determined from the captured image of that animal.

In one embodiment of the invention the method is configured to be carried out in a signal processor.

Preferably, the method is configured to be carried out in a computer.

The invention also provides a method for determining the identity of an animal of a herd of animals in or entering a stall of one of a milking parlour and a single stall milking apparatus, the method comprising capturing an image of at least a part of the animal in the stall or as the animal is entering the stall with an image capturing device, comparing the captured image or a feature vector computed from the captured image with a plurality of stored reference images or stored reference feature vectors of the respective animals of the herd cross-referenced with the identities of the animals until a best match is detected matching the captured image with one of the reference images, or matching the computed feature vector with one of the reference feature vectors, and determining the identity of the animal based on the best match.

Additionally, the invention provides apparatus for determining the identity of an animal of a herd of animals, the apparatus comprising a first storing means for storing a plurality of reference images or reference feature vectors of the respective animals of the herd cross-referenced with the identities of the respective animals, an image capturing device for capturing an image of at least a part of an animal, a comparing means for comparing the captured image of the animal with the reference images stored in the first storing means or for comparing the computed feature vector with the reference feature vectors stored in the first storing means until a best match is detected matching the captured image with one of the reference images, or matching the computed feature vector computed from the captured image with one of the reference feature vectors, and a means for determining the identity of the animal based on the best match.

Preferably, the reference images of the respective animals are stored in electronic form in the first storing means.

In one embodiment of the invention a plurality of reference images of each one of the respective animals is stored in electronic form in the first storing means, and the comparing means is configured to compare the captured image using a statistical sampling best match method with the reference images sequentially until the best match has been identified.

In another embodiment of the invention the reference images of each corresponding animal are reference images of approximately similar parts of the corresponding animals.

Preferably, the image capturing device is configured to capture an image of a part of the corresponding animal.

Advantageously, the one or more of the reference images of each corresponding animal are updated each time an image of the animal is captured and matched with the reference image or images of the corresponding animal.

Preferably, a previously captured image of each animal is stored in a reference image data file in the first memory as a reference image of that animal, and each reference image data file is cross-referenced with the identity of the corresponding animal.

Advantageously, the comparing means is configured as a learning model. Preferably, the comparing means comprises a deep learning model.

In one embodiment of the invention each reference image is stored in electronic form in the first storing means.

In one embodiment of the invention the apparatus further comprises an independent system for determining the identity of the respective animals of the herd independently of the apparatus. Preferably, the independent identifying system comprises an electronic based identifying system. Advantageously, the independent identifying system is based on a radio frequency based identifying system. Preferably, the independent identifying system is configured for reading an electronically readable identifying code stored in or on the animal.

In one embodiment of the invention the identifying code is electronically stored in an electronic medium.

In another embodiment of the invention the identity of each animal identified from the comparison of the computed image with the reference image of that animal is compared with the identity determined for that animal by the independent identifying system, and if the two determined identities are of the same animal, that captured image of that animal is stored in the first storing means as a confirmed reference image for that animal. Preferably, if the identity of the one of the animals identified by the comparison of the captured image with the reference image for that animal is different to the identity determined by the independent identifying system for that animal, a conflict alert signal is produced for alerting to the conflict between the two determined identities for that animal.

In another embodiment of the invention the reference feature vectors are stored in the first storing means as a data set comprising the reference feature vectors of the respective animals of the herd.

In one embodiment of the invention each reference image is stored in the first memory in digital form, and each metric of each reference feature vector is computed from the digital form of the reference image of that animal.

In another embodiment of the invention the identity of each animal identified from the comparison of the computed feature vector with the referenced feature vector of that animal is compared with the identity determined for that animal by the independent identifying system, and if the two determined identities are of the same animal, that computed feature vector of that animal is stored in the first storing means as a confirmed reference feature vector for that animal.

In a further embodiment of the invention if the identity of the one of the animals identified by the comparison of the computed feature vector with the reference feature vector for that animal is different to the identity determined by the independent identifying system for that animal, a conflict alert signal is produced for alerting to the conflict between the two determined identities for that animal.

In one embodiment of the invention the reference feature vectors of groups of the animals of the herd are stored in the first storing means in respective classification groups of reference feature vectors, whereby at least one metric of the reference feature vector of each of the animals of each classification group comprises a metric of an element of the reference image of that animal of that classification group which is an element common to the reference images of the animals of that classification group.

Preferably, each reference feature vector of each classification group comprise more than one metric of one or more of the elements of the reference image from which that reference feature vector was computed, which is an element or are elements common to the reference images from which the reference feature vectors of that classification group were computed.

Advantageously, the reference feature vectors of each classification group comprise respective matrices of metrics of one or more elements common to the reference images from which the respective reference feature vectors of that classification group were computed.

In one embodiment of the invention the apparatus comprises a signal processor.

Preferably, the signal processor comprises a computer.

In another embodiment of the invention the signal processor is configured to select the reference feature vectors of the respective animals of the herd from reference images of the respective animals so that the metrics of the matrices of the metrics of the respective reference feature vectors are spaced apart sufficiently from each other so that the reference feature vectors of the respective animals are distinguishable from each other.

Preferably, the signal processor is configured to carry out steps of a learning model to generate the reference feature vectors of the respective animals from the reference images of the respective animals.

Advantageously, more than one reference feature vector for each animal is stored in the first storing means.

In one embodiment of the invention the signal processor is configured to update the reference feature vector of each animal each time a computed feature vector of a just captured image of that animal is matched with a reference feature vector of that animal, and the signal processor is configured to store the computed feature vector from the just computed image of that animal in the first storing means as a most recent reference feature vector of that animal with the other stored reference feature vectors of that animal cross-referenced with the identity of that animal.

Preferably, not more than a predefined number of reference feature vectors for each animal are stored in the first storing means.

In another embodiment of the invention the signal processor is configured to delete the oldest stored reference feature vector of each animal which is not a confirmed reference feature vector from the stored reference feature vectors of that animal, each time the number of reference feature vectors stored for that animal exceeds the predefined number of stored feature vectors, and if all the reference feature vectors stored for that animal are confirmed reference feature vectors, the signal processor is configured to delete the oldest one of the confirmed reference feature vector of that animal.

Preferably, each time a match is not found for a computed feature vector computed from a just captured image of an animal, the signal processor is configured to store that computed feature vector in the first storing means as a reference feature vector of that animal as a new animal, and a new animal alert signal is produced indicating that a new animal has been detected, and that the identity of the new animal is to be entered into the first storing means and cross-referenced with the just stored reference feature vector of that new animal.

Advantageously, on each computed feature vector being computed from a just captured image of an animal, the signal processor is configured to determine the classification group of the reference feature vectors of the animals to which the computed feature vector is closest, and the comparing means compares the computed feature vector with the reference feature vectors of that classification group until a best match of the computed feature vector with one of the reference feature vectors of that classification group is detected.

In one embodiment of the invention if a best match of the computed feature vector computed from the just captured image with the reference feature vectors of the determined closest classification group is not detected, the comparing means compares the computed feature vector with the reference feature vectors of the other classification groups until a best match with one of the reference feature vectors is determined.

In one embodiment of the invention the signal processor is configured to carry out the steps of a learning model, and each captured image is subjected to the steps of the learning model to compute the feature vector.

Preferably, the signal processor is configured as a one-shot deep learning model for permitting the creation and the inclusion of additional reference feature vectors of corresponding animals added to the herd to be added to the learning model on the fly.

Advantageously, the learning model in which the signal processor is configured is based on metric learning.

Preferably, the signal processor is configured to carry out the steps of the learning model for distinguishing between the animals in the herd, so that each of the animals in the herd can be subsequently identified from the corresponding computed feature vector computed from the captured images of that animal.

Advantageously, the signal processor is configured to carry out the steps of the metric learning model to generate the reference feature vectors of the respective animals of the herd in a feature space, such that the metrics are spaced apart sufficiently from each other in order to allow the reference feature vector of each animal to be distinguishable from the reference feature vectors of the respective other animals of the herd.

In one embodiment of the invention the reference images are stored digitally.

Preferably, the captured images and the reference images are captured in digital form by the image capturing device.

In one embodiment of the invention the image capturing device comprises a digital video image capturing device.

In another embodiment of the invention the image capturing device comprises a charge coupled device.

In another embodiment of the invention the image capturing device comprises a CMOS device.

In a further embodiment of the invention the image capturing device comprises a photonic mixer device using CMOS technology.

In one embodiment of the invention the image capturing device is located for capturing the image of the animal in or adjacent a stall of one of a milking parlour and a single stall milking apparatus.

In another embodiment of the invention the image capturing device is located adjacent the stall towards one end of the stall.

In a further embodiment of the invention the determined identity of the animal is cross-referenced with the identification number of the stall in which the animal is located.

Additionally, the invention provides apparatus comprising a signal processor configured for carrying out the method according to the invention.

Further the invention provides apparatus comprising a signal processor configured for carrying out the method for determining the identity of an animal of a herd of animals in or entering a stall of one of a milking parlour and a single stall milking apparatus.

The invention further provides a milking parlour comprising the apparatus according to the invention for determining the identity of an animal of a herd of animals, the image capturing device of the apparatus being located to capture an image of the animal in or adjacent a stall of the milking parlour.

In one embodiment of the invention the image capturing device of the apparatus is located to capture an image of the animal when the animal is in a stall of the milking parlour.

In another embodiment of the invention the image capturing device of the apparatus is located to capture an image of the animal after the animal has entered the stall of the milking parlour.

In a further embodiment of the invention the image capturing device is located at a level above the stall.

In another embodiment of the invention the image capturing device is located towards one end of the stall.

In another embodiment of the invention the independent animal identifying system is located for reading the electronically readable codes from the respective animals as the animals are entering the milking parlour.

Preferably, the independent animal identifying system is located for reading the electronically readable codes from the respective animals as the animals are in a passageway leading to the milking parlour.

Advantageously, the independent animal identifying system is located for reading the electronically readable codes from the respective animals as each animal is about to enter the stall.

In one embodiment of the invention a means for monitoring milk from each stall is provided.

In another embodiment of the invention the means for monitoring the milk from each stall is configured to monitor at one of the milk yield, the milk composition, the milk let down and the milking time of each animal.

In another embodiment of the invention the signal processor is configured to store data indicative of at least one of the milk yield, the milk composition, the milk let down and the milking time of each animal cross-referenced with the identity of the animal.

In one embodiment of the invention a monitoring means is provided for monitoring one or more of the milk yield, the milk composition, the milk let down and the milking time during each milking cycle, and the signal processor is configured to store the monitored one or more of the milk yield, the milk composition, the milk let down and the milking time cross-referenced with the identity of the animal.

In another embodiment of the invention the signal processor is configured to identify health issues of each animal from the milk monitored by the monitoring means of each animal, and the signal processor is configured to store any identified adverse health issues of that animal cross-referenced with the identity of the animal.

In a further embodiment of the invention feed is supplied to each animal, and the feed supplied to the animal, and a monitoring means is provided for monitoring the feed, and the signal processor is configured to compute the weight of the feed consumed by the animal during each milking cycle, and to store the computed weight cross-referenced with the identity of the animal.

In one embodiment of the invention one reference auxiliary characteristic of each animal of the herd is stored cross-referenced with the identity of the animal, and the signal processor is configured for determining the identity of each animal by determining at least one auxiliary characteristic of that animal corresponding to the at least one stored reference auxiliary characteristic, and comparing the at least one determined auxiliary characteristic with the stored reference auxiliary characteristics of the animals of the herd until a best match of the determined auxiliary characteristic with one of the reference auxiliary characteristics is found, and the signal processor is further configured to determine the identity of the animal as the identity of the animal of the matching reference auxiliary characteristic.

In another embodiment of the invention on each animal being identified, the signal processor is configured to store the one or more of the determined auxiliary characteristics as the most recent one or more of the reference auxiliary characteristic for that animal cross-referenced with the identity of that animal.

In another embodiment of the invention no more than a predefined number of each one of the reference auxiliary characteristics is stored for each animal, and when the number of each one of the reference auxiliary characteristics stored for each animal has been reached, the signal processor is configured to delete the oldest one of the corresponding reference auxiliary characteristics of that animal.

In another embodiment of the invention the reference auxiliary characteristics comprise one or more of a reference weight of seed consumed, a reference milk yield, a reference milk composition, a reference milk let down and a reference milking time of each of the respective animals of the herd, and the signal processor is configured to determine one or more of the weight of feed consumed, the milk yield, the milk composition, the milk let down and the milking time of each animal during each milking cycle.

In another embodiment of the invention one of the reference auxiliary characteristics comprises at least one reference adverse health issue of each animal of the herd with an adverse health issue.

In a further embodiment of the invention the signal processor is configured to determine an adverse health issue for each animal with an adverse health issue.

In another embodiment of the invention the signal processor is configured to derive the adverse health issue from each animal from one of the captured images of that animal or from the milk monitored from that animal.

In another embodiment of the invention one of the reference auxiliary characteristics comprises a reference lameness score of each animal of the herd.

In a further embodiment of the invention the signal processor is configured to determine a lameness score of each animal from the captured image of that animal.

In one embodiment of the invention the milking parlour comprises a plurality of stalls.

In another embodiment of the invention the milking parlour comprises a rotary milking parlour having a plurality of stalls on a rotatable platform.

In a further embodiment of the invention the milking parlour comprises a single stall milking apparatus.

Further, the invention provides a single stall milking apparatus comprising the apparatus for determining the identity of an animal from a herd of the animals, the image capturing device of the apparatus being located in or adjacent the single stall for capturing an image of the animal in the stall.

The invention also provides apparatus comprising a signal processor configured for carrying out the method according to the invention.

Further, the invention provides apparatus comprising a signal processor configured for carrying out the method for determining the identity of an animal of a herd of animals in or entering a stall of one of a milking parlour and a single stall milking apparatus.

Additionally, the invention provides a milking parlour comprising the apparatus according to the invention for determining the identity of an animal of a herd of animals, the image capturing device of the apparatus being located to capture an image of the animal in or adjacent a stall of the milking parlour.

The advantages of the invention are many. A particularly important advantage of the invention is that the method and apparatus according to the invention permits the identity of each animal in each stall of a milking apparatus, or each animal or the animals in a drafting crate or the animal or animals adjacent a feeding station or a drinking trough to be accurately identified. This is achieved by virtue of the fact that the animals are identified by one or more images of each animal being identified. A further advantage of the invention is achieved when an independent animal identifying system independent of the apparatus is provided, since the independent animal identifying system either confirms the identity of the animal, or if the two determined identities differ, a conflict alarm signal is produced drawing attention to the conflict in the two determined identities of the animal.

These and many other advantages of the invention will become readily apparent to those skilled in the art from embodiments of the invention which will be described.

Figure 3:
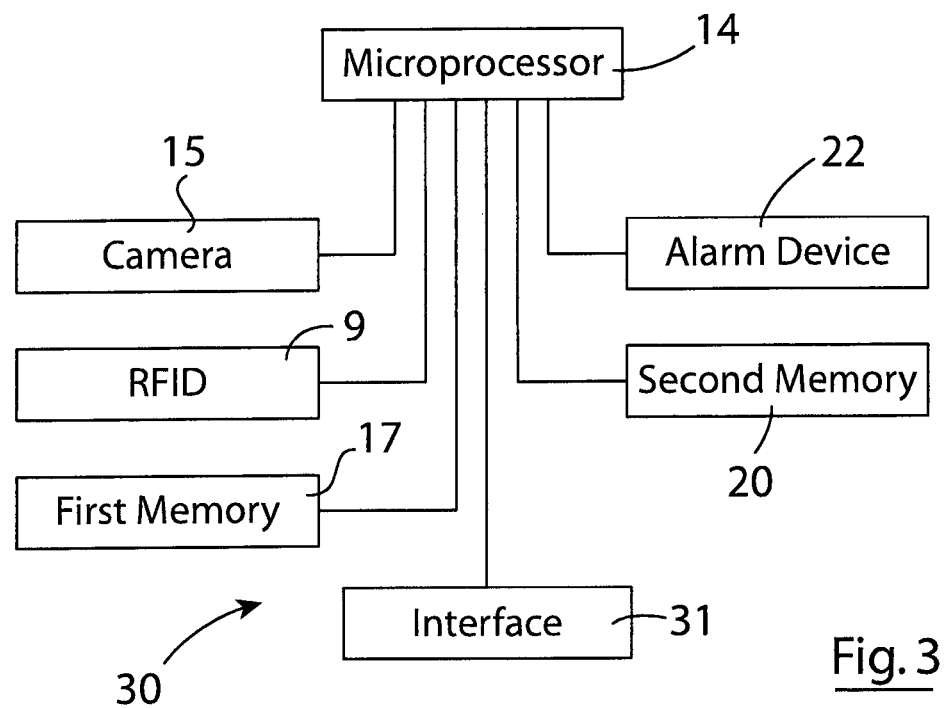
Figure 2:
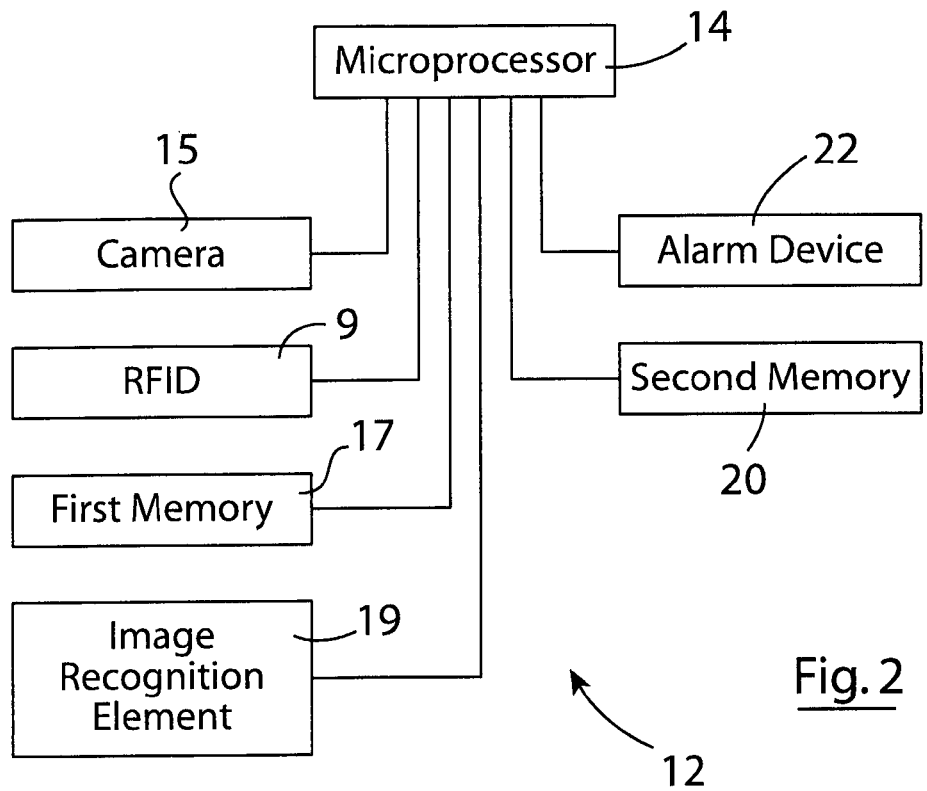
Figure 4:
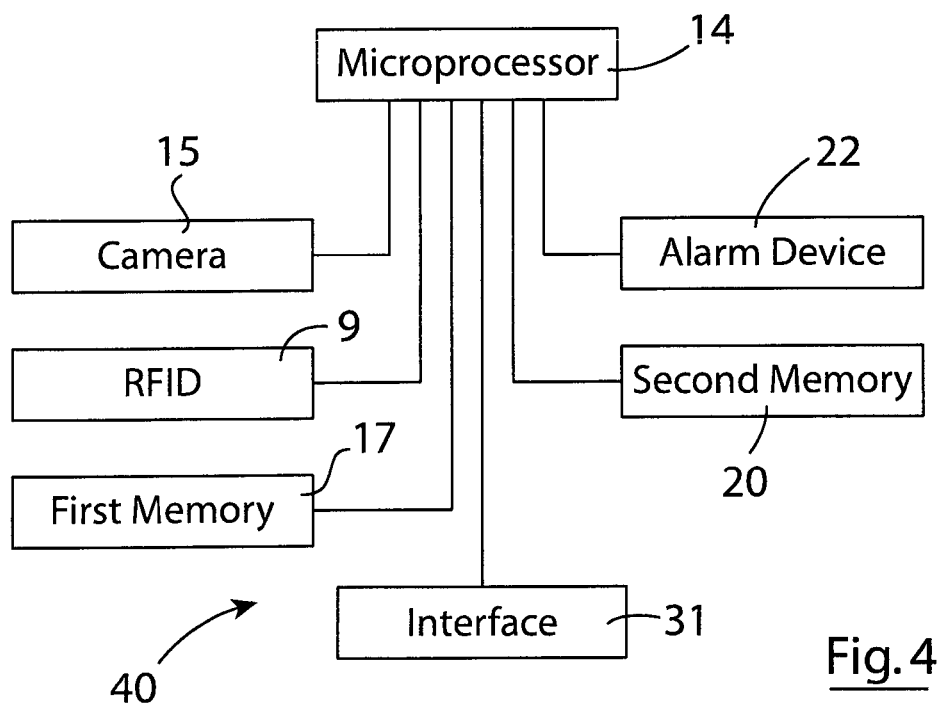
Figure 5:
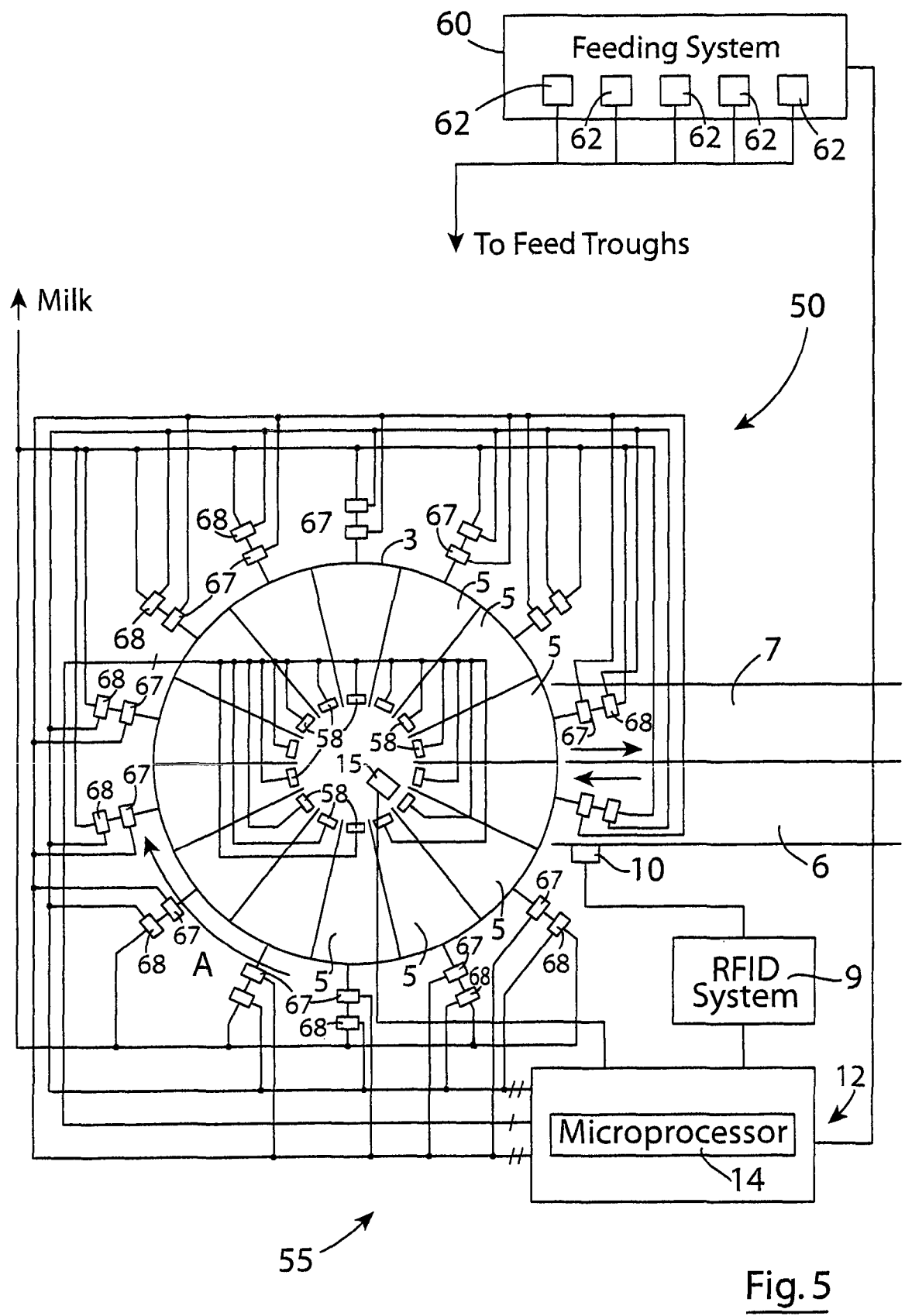
Figure 6:
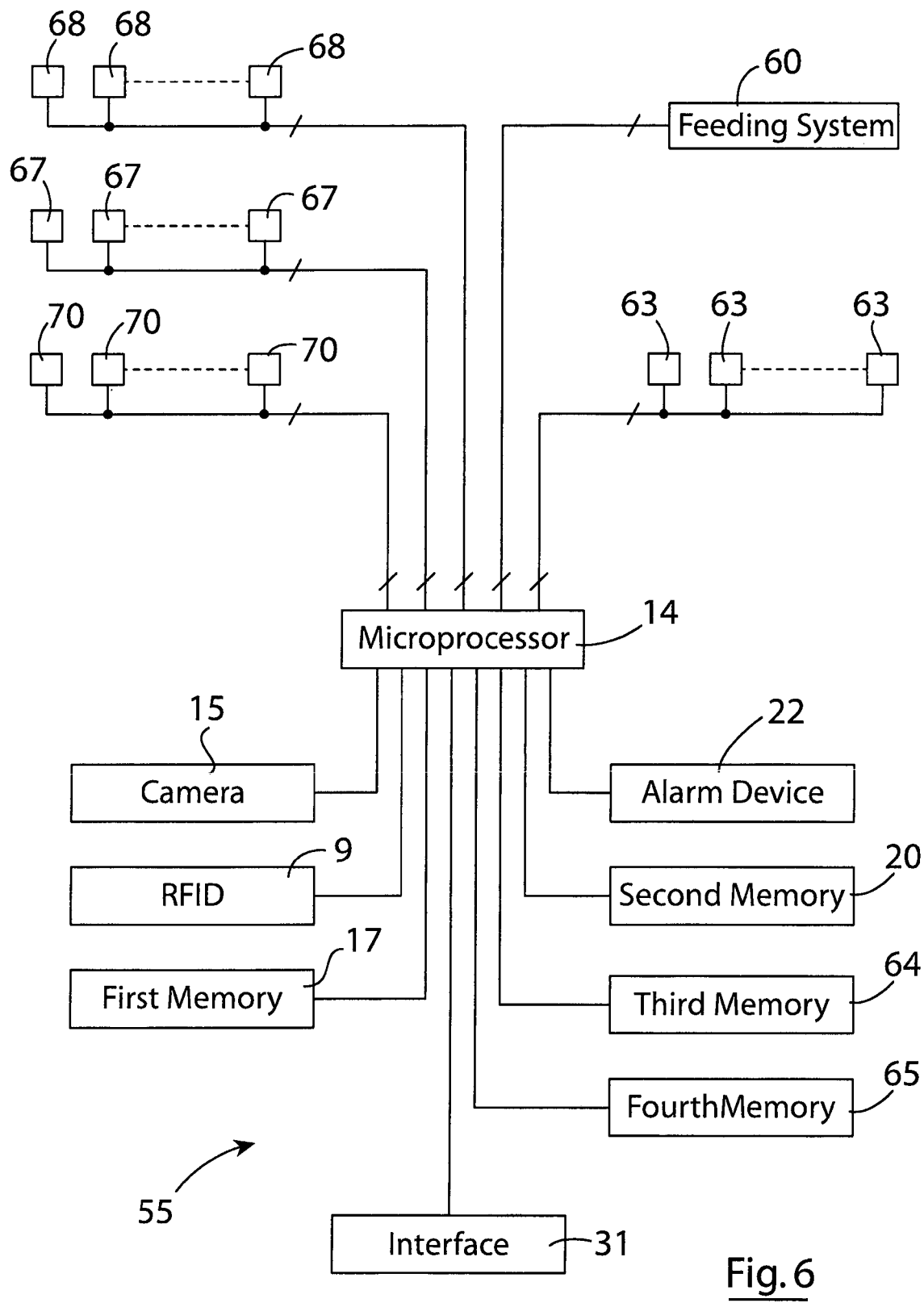

The invention will be more clearly understood from the following description of some preferred embodiments thereof which are given by way of example only with reference to the accompanying drawings, in which:

FIG. 1 is a schematic top plan view of a rotary milking platform according to the invention of a milking parlour also according to the invention, FIG. 2 is a block representation of apparatus also according to the invention for determining the identity of an animal for use with the rotary milking platform of FIG. 1, FIG. 3 is a block representation of apparatus according to another embodiment of the invention for determining the identity of an animal for use with the rotary milking platform of FIG. 1, FIG. 4 is a block representation of apparatus according to another embodiment of the invention for determining the identity of an animal for use with the rotary milking platform of FIG. 1, FIG. 5 is a schematic top plan view of a rotary milking platform according to another embodiment of the invention, and FIG. 6 is a block representation of apparatus according to another embodiment of the invention for determining the identity of an animal for use with the rotary milking platform of FIG. 5.

Referring to the drawings and initially to FIGS. 1 and 2 thereof, there is illustrated a milking parlour according to the invention indicated generally by the reference numeral 1. The milking parlour 1 comprises a rotary platform 3 comprising a plurality of stalls 5 arranged circumferentially around the platform 3 for accommodating respective animals, for example, cows, goats or the like during milking thereof. An entry passageway 6 accommodates animals in single-file to the platform 3, so that as the platform rotates in the direction of the arrow A, the animals in the entry passageway 6 sequentially enter the stalls 5 as the stalls 5 become sequentially aligned with the entry passageway 6. An exit passageway 7 extends from the platform 3 for accommodating animals from the platform 3 as the stalls 5 sequentially align with the exit passageway 7, at which stage the milking of each animal having completed one revolution on the platform 3 should be completed.

Apparatus also according to the invention and indicated generally by the reference number 12, which is described in detail below, is provided for determining the identities of animals of a herd of the animals in the stalls 5 of the rotary platform 3. The apparatus 12 comprises a signal processor 14 which controls the operation of the apparatus 12, and on the identity of the animals in the respective stalls 5 being determined, the identities of the animals are stored and cross-referenced with the identification numbers of the stalls 5 in which the respective animals are located as will be described below. In this embodiment of the invention the signal processor 14 comprises a microprocessor 14, although it will be appreciated that any other suitable signal processor may be provided.

An independent identifying system 9, independent of the apparatus 12 is also provided for identifying the animals, and in this embodiment of the invention the independent identifying system 9 comprises an RFID animal identifying system 9. The animal identifying system 9 is configured to identified the animals as the animals of the herd sequentially enter the stalls 5 of the platform 3 from the entry passageway 6.

An RFID reader 10 of the RFID animal identifying system 9 is located on a support (not shown) adjacent a location of the entry passage 6 which is adjacent the milking platform 3. The RFID reader 10 is configured to read RFID tags (not shown) of the respective animals, which typically are attached to the animals by collars or to the ears of the respective animals, as the animals are sequentially entering the stalls 5 from the entry passageway 6. The RFID tags as will be understood by those skilled in the art contain respective electronically readable animal identifying codes for identifying the animals. The animal identifying codes are read by the RFID reader 10 as the animals are about to enter the respective stalls 5. The RFID animal identifying system 9 reads signals from the RFID reader 10, which are indicative of the read codes, and determines the identity of each animal as the animal is about to enter the stall 5 which is aligned with the entry passageway 6, from the entry passageway 6. The RFID animal identifying system 9 sequentially produces signals indicative of the identities of the animal as the animals are about to enter the stalls 5 from the entry passageway 6. The microprocessor 14 of the apparatus 12 reads the signals indicative of the identities of the animals produced by the RFID animal identifying system 9 and stores the identity of each animal cross-referenced with the identifying number of the stall 5 into which the animal is detected as entering, as will also be described below.

Turning initially to the apparatus 12, the apparatus 12 comprises an image capturing device, in this embodiment of the invention provided by a digital camera 15, which will be described in more detail below, for capturing one or more images of the animal in each stall 5 as that stall 5 has just moved out of alignment with the entry passageway 6 to the extent that the animal in the stall 5 cannot exit the stall. In this embodiment of the invention the camera 15 is located at a level above the stall 5 and is offset in the rotational direction, namely, in the direction of the arrow A from the position of the stall 5 when it is aligned with the entry passageway 6. As well as being offset in the direction of the arrow A, the camera 15 is also located adjacent the inner end of the stalls 5, so that the camera 15 is configured to capture one or more images of the animal when viewed from above looking down on the animal which includes the visible parts of the top part of the back, the top of the head of the animal, and the face of the animal.

If all the animals of the herd or herds to be milked in the milking parlour have inherent distinguishing features on the top part of the back, on the top part of the head or on the face of the animal the apparatus 12 is configured to determine the identity of the animals from those inherent distinguishing features. Otherwise, some or all of the animals may be provided with an additional distinguishing feature, such as a symbol, which may be attached or applied to the animal. Such a distinguishing symbol, may be for example, be a graphical symbol unique to that animal, a code comprising a series of letters, a series of numerals or a distinctive alpha, numeric or an alpha-numeric code or alternatively, the distinguishing symbol may be a bar code or a QR code, all of which would directly identify the animal. Such symbols or codes may be branded directly onto the back of the animal, or may be attached to the animal by a strap or the like, and would be oriented on the animal to be in the line of sight of the camera 15 when the animal is in the stall 5.

Alternatively, or additionally, the apparatus 12 may be configured to determine the identity of the animal from the shape of the body, the rump, the head and/or face of the animal and/or other characteristics of the animal. Typically, the camera 15 is located so that the animal or the part of the animal, the image of which is to be captured, substantially fills the field of view of the camera.

In this embodiment of the invention the camera 15 comprises a photonic mixer device based on CMOS technology and is configured to produce three-dimensional time of flight data, in order to produce three-dimensional images of the animals. However, it will be understood that other suitable cameras may be used, both video and still, and suitable cameras may include charge coupled devices, CMOS based devices, a stereoscopic imaging or a structured light three-dimensional scanning device, and other such video or still cameras configured to produce two or three-dimensional images of the animals or any other suitable device. The microprocessor 14 reads digital data signals from the camera 15 indicative of the captured images of the respective animals.

The apparatus 12 comprises a first memory 17, typically, a random access memory which stores reference images in digital form of all the animals of the herd. The reference images are three-dimensional images and are stored in the first memory 17 cross-referenced with the identity of the respective corresponding animals of the herd of animals. The identity of each animal, typically, is stored as a unique identifying number. A predefined number of reference images are stored for each animal in an image data file of the corresponding animal, which is stored and cross-referenced with the identity of the animal in the first memory 17. The reference images initially are images captured of the respective animals from the same direction as the camera 15 captures the images of the animals once they are located in the relevant stall 5. Thus, the reference images stored in the first memory 17 include any distinguishing features of the respective animals which as discussed above, may be an inherent distinguishing feature, or other characteristics of the corresponding animal, or distinguishing features applied to or attached to the animals, in cases where some or all of the animals include such features.

A comparing means, in this case an image recognition element 19 also located in the apparatus 12 is operated under the control of the microprocessor 14 for comparing each captured image of each animal as it is captured with the reference images stored in the image data files of the animals of the herd stored in the first memory 17, and for identifying the reference image which best matches the captured image.

On the best match being identified, the microprocessor 14 is configured to read the identity of the animal stored in the first memory 17 cross-referenced with the image data file of the matching reference image or images. The microprocessor 14 is configured to then store the identity of the animal in a second memory 20, for example, a random access memory, cross-referenced with an identification number which identifies the stall 5 of the platform 3 in which that animal is located.

In this embodiment of the invention the image recognition element 19 is programmed to operate in accordance with a deep learning model, which is configured to carry out a predefined machine learning image matching algorithm, which carries out the matching based on a statistical analysis best match basis.

In this embodiment of the invention the captured images are passed by the microprocessor 14 through the deep learning model in the image recognition element 19, which compares each captured image with each of the reference images stored in each of the image data file of the respective animals until the best match is detected which matches the animal, the subject of the captured image with one of the animals of the reference images. The deep learning model compares the characteristics and distinguishing features of each captured image with the characteristics and distinguishing features of the reference images in order to identify the best match.

During the matching process the captured image is compared with each of the reference images of each animal using a statistical analytical sampling best match method, which will be understood by those skilled in the art. However, it will be readily apparent to those skilled in the art that any other matching method for comparing the captured image of each animal with the reference images of the respective animals may be used, and it is envisaged that in general a number of reference images of each animal will be stored in the first memory 7. Additionally, it will be appreciated that the functions of the image recognition element 19 may be implemented in software in the microprocessor 14 or in any other suitable signal processor.

In this embodiment of the invention the microprocessor 14 as discussed above reads the signals indicative of the identity of the animals from the RFID animal identifying system 9 as each animal is passing from the entry passageway 6 to the aligned stall 5 of the platform 3. The microprocessor 14 determines the identification number of the stall 5 which is aligned with the entry passageway 6, and into which that identified animal is expected to enter. The identity of the animal identified by the RFID animal identifying system 9 is cross-referenced with the identification number of the stall 5 and stored in the second memory 20. Once the identity of the animal in that stall 5 has been subsequently identified by the apparatus 12 from the image of the animal in that stall 5 captured by the camera 15, the microprocessor 14 compares the two determined identities of the animal in that stall 5 from the signals read from the RFID system 9 and from the image captured of the animal. If the two determined identities of the animal match, an indication of this is stored in the second memory 20 cross-referenced with the identity of the animal, and the captured image of the animal in that stall 5 is stored in the first memory 17, as the most recent reference image of that animal, and is confirmed as a confirmed reference image of that animal.

However, if the two determined identities of the animal in that stall 5 do not match, then the microprocessor 14 outputs a conflict alert signal to an alarm device 22 which activates an alarm to draw attention to the fact that the determined identity of the animal based on the captured image of the animal in that stall 5 captured by the camera 15 is different to the determined identity of the animal in that stall 5 identified by the RFID system 9.

The conflict alarm signal may be an audible alarm signal which would alert personnel in the milking parlour 1 to the identity conflict problem, or it may be a signal which would activate a transmitter to transmit a text message to a farmer, or to the cloud system which would alert the farmer to the existence of the conflict between the two determined identities of the animal in that stall 5. Additionally, the microprocessor 14 is configured to raise a flag in the second memory 20 corresponding to the stored data relating to that animal indicating that the animal may not be the same animal as that which had been identified by the RFID system 9. The person in the milking parlour, or the farmer, can then investigate the conflict in the two identities of the animal in that particular stall 5, and the correct identity of the animal in that stall 5 can then be inputted into the microprocessor 14 through a suitable interface for inputting data to the microprocessor 14. The microprocessor 14 then makes appropriate corrections to the stored data in the second memory 20.

Initially only a few reference images, for example, three or four reference images of each animal are stored in the first memory 17 in the reference image data file of each animal. However, over a period of time during which each animal is subjected to a number of milking cycles in the milking parlour 1, as each best match is identified of a captured image with one of the reference images, the most recently captured image of that animal is stored in the first memory 17 in the reference image data file of that animal as the most recent reference image of that animal. This process continues until the predefined number of reference images of that animal have been stored in the reference image data file and cross-referenced with the identity of that animal. The predefined number of reference images is typically, thirty reference images. Once the number of reference images stored and cross-referenced with each animal reaches the predefined number of reference images for that animal, the next time an image of that animal is captured and matched, that captured image is saved and stored in the reference image data file of that animal in the first memory 17 as the most recent reference image of that animal, and the oldest saved reference image of that animal which is not a confirmed reference image is deleted from the reference image data file of that animal, thereby maintaining the number of stored reference images for each animal in the corresponding reference image data file constant at the predefined number of reference images. If there are no reference images, which are not confirmed reference images, in the reference image data file of that animal, then the oldest confirmed reference image is deleted.

In this embodiment of the invention the microprocessor 14 is configured to monitor other aspects of the animals in the stalls 5 including the milk yields from the respective animals. A monitoring system (not shown) is provided for monitoring the milk output from each stall from the commencement of milking of each animal until milking of that animal has been completed. The microprocessor 14 reads signals from the monitoring system and determines the milk yield of each animal during each milking cycle, and the milk yield of each animal is stored and cross-referenced with the identity of the relevant animal in the second memory 20.

Additionally, the monitoring system (not shown) is also configured to monitor the milk from each animal for diseases and other health issues, and on determining any diseases or negative health issues of the animal, data relating to such diseases and negative health issues detected from the milk of an animal is communicated to the microprocessor 14, which stores and cross-references such data in the second memory 20 cross-referenced with the identity of the relevant animal. The monitoring system for monitoring the milk for diseases and other health issues may be configured to monitor the bacteria count in the milk, to monitor for blood in the milk, and to monitor for other indicators in the milk indicative of health issues of the animals.

In this embodiment of the invention a feeding system (also not shown) is also provided to each stall 5 in the milking parlour, and on the identity of each animal in the stalls 5 being determined, a suitable feed for that animal and a predefined quantity of that feed for that animal is dispensed into a trough (not shown) in the corresponding stall 5. On each animal exiting the platform 3, the quantity of feed remaining in the trough of the stall 5 just vacated by the animal is weighed and the weight of the quantity of the feed remaining in the trough is communicated to the microprocessor 14, which determines the quantity of food consumed by that animal. The quantity of consumed food by each animal is stored in the second memory 20 cross-referenced with the identity of the relevant animal.

All the data stored in the second memory 20 in connection with each animal is readily available to a farmer or others by communicating with the microprocessor 14 through any suitable communicating interface, for example, via a hard wire connection, Wi-Fi, via the cloud, the internet, or any other suitable communicating means.

In use, as the animals pass through the entry passageway 6 and sequentially enter the stalls 5 as the platform 3 rotates, the RFID animal identifying system 9 reads signals from the ear or other tags of each animal as it is entering the stall 5 aligned with the entry passageway 6. The microprocessor 14 reads the identity of each animal from the RFID animal identifying system 9 and the identification number of the stall 5 which that animal is about to enter. The microprocessor 14 then stores the identity of that animal cross-referenced with the identification number of the stall 5 in the second memory 20.

Once an animal has entered the stall 5 which is aligned with the entry passageway 6, and the platform 3 has rotated to urge the stall 5 sufficiently out of alignment with the entry passageway 6 to the extent that the animal can no longer exit the stall 5, the camera 15 captures one or more images of the animal in the stall 5 which has just moved out of alignment with the entry passageway 6. The microprocessor 14 reads the captured images. The microprocessor 14 then activates the image recognition element 19 to compare the captured image with the reference images in the first memory 17, and to determine the best match of the captured image with the reference images as discussed above. The microprocessor 14 then reads the identity of the animal from the first memory 17 corresponding to the reference image identified by the image recognition element 19 as being the best match. The microprocessor 14 then stores the identity of the animal cross-referenced with the identification number of the stall 5 of the platform 3 in which that animal is located in the second memory 20.

The microprocessor 14 then compares the determined identity of the animal in that stall 5 based on the captured image of that animal with the determined identity of the animal determined by the RFID animal identifying system 9 for that stall 5. If the two determined identities match, the microprocessor 14 confirms the identity of the animal in that stall 5. The microprocessor 14 also stores the captured image of that animal as the most recent reference image of that animal in the first memory 17 in the reference image data file of that animal, and deletes the oldest one of the reference images of that animal if the number of reference images of that animal stored in the reference image data file will exceed the predefined number of reference images, as discussed above.

On the other hand, if the two determined identities of the animal do not match, the microprocessor 14 activates the alarm device 22 which produces the conflict alarm signal, which may be an audible or a visual alarm, or may comprise a transmitter for transmitting a signal or a text message indicative of the alarm condition. Additionally, the microprocessor 14 sets a flag in the second memory 20 against the identity of the animal indicating the conflict between the two determined identities of the animal determined from the captured image of the animal and the identity determined by the RFID identifying system 9.

The microprocessor 14 also monitors the milking of the respective animals as discussed above, and data indicative of the milk yield of each animal and any health issues of the animals are stored in the second memory 20 cross-referenced with the identity of the corresponding animal. The quantity of feed consumed by each animal is also stored in the second memory 20 cross-referenced with the identity of the animal.

Referring now to FIG. 3, a second embodiment of apparatus according to the invention and indicated generally by the reference numeral 30 for determining the identity of the animals in the stalls 5 of the rotary platform 3 of FIG. 1 will now be described. The apparatus 30 is substantially similar to the apparatus 12 of FIG. 2, and similar components are identified by the same reference numerals. The main difference between the apparatus 30 and the apparatus 12 is that the image recognition element 19 has been omitted. In this embodiment of the invention the signal processor 14, which also comprises a microprocessor, is configured to compare data computed from the image or images captured of each animal in the stalls 5 of the platform 1 with the reference images of the animals of the herd stored in the first memory 17 and cross-referenced with the identities of the respective animals, and to identify the animals from the computed data computed from the captured images of the animals as will now be described.

In this embodiment of the invention a data set of reference feature vectors for the respective animals of a herd of animals is stored in the first memory 17 and cross-referenced with the identities of the respective animals. The reference feature vector of each animal comprises a matrix of metrics initially derived from one and in general a number of captured images of the corresponding animal captured by the camera 15, or by another digital camera, which preferably, would be a digital camera similar to the camera 15. The metrics for each animal are computed from the original captured image or images of that animal, and are originally selected, so that the metrics for the respective animals are suitable for distinguishing the animals of the herd from each other. When the matrix of the metrics have been computed for each animal it is stored in the first memory 17 as the reference feature vector for that animal in the data set of the reference feature vectors and cross-referenced with the identity of that animal. The initial derivation of the reference feature vectors will be described below.

Once the data set of the reference feature vectors for the respective animals of the herd has been prepared and stored in the first memory 17, each time an animal is about to enter one of the stalls 5 of the platform 3 as described with reference to FIGS. 1 and 2, the identity of that animal is read by the microprocessor 14 from the RFID system 9, and is stored in the second memory 20 cross-referenced with the identification number of the stall 5 about to be entered by the animal. Once the animal is in the stall 5, and the stall 5 has moved out of alignment with the entry passageway 6 to the extent that the animal cannot exit the stall 5, the camera 15 captures one and generally a number of images of the animal in that stall 5. In this embodiment of the invention the microprocessor 14 is programmed to compute a feature vector comprising a matrix of the relevant metrics from that captured image or images, which correspond with the matrix of the metrics of the reference feature vectors of the data set for the herd. The microprocessor 14 is also programmed to compare the computed feature vector of that animal with the data set of the reference feature vectors stored in the first memory 17.

The microprocessor 14 is programmed to carry out the comparison of the computed feature vector computed from the captured image of that animal with the data set of the reference feature vectors using a neural network trained by a metric learning model. The metric learning model compares the computed feature vector of that animal with the reference feature vectors of the animals of the herd in the data set. If there is only one reference feature vector with which the computed feature vector virtually entirely corresponds, the microprocessor 14 is programmed to select that reference feature vector as the best match. The microprocessor 14 then determines the identity of the animal of that reference feature vector as the predicted identity of the animal. The predicted identity of the animal is stored in the second memory 20 cross-referenced with the predicted identity of the animal. The predicted identity of the animal is then compared with the identity of the animal already read from the RFID system 9 and stored in the second memory 20 for the animal in the stall 5 for which the predicted identity is in respect of. If the predicted identity of the animal is similar to the identity of that animal read from the RFID system 9, then the predicted identity of that animal is confirmed and stored cross-reference with the identification number of the stall 5 of the platform 3 in which that animal is located. Additionally, the computed feature vector for that animal is stored in the first memory 17 as the most recent confirmed reference feature vector for that animal.

On the other hand, if the computed feature vector for that animal does not produce a single best match, but rather produces a plurality of possible matches with reference feature vectors of a number of the animals of the herd, the microprocessor 14 is programmed to select a predefined number of the possible matching reference feature vectors which are closest to the computed feature vector, for that animal. In this case, the microprocessor 14 is programmed to select the closest five matching reference feature vectors which are then ranked in order of the closeness to the computed feature vector, the closest match being ranked first. The microprocessor 14 is programmed to then compare the identities of the animals of the selected predefined number of the closest reference feature vectors with the identity of the animal already read from the RFID system 9 of the animal for the stall 5, in which the animal, for which the match of the computed feature vector is being sought, is located. If the identity of one of the animals of one of the predefined number of the closest matching reference feature vectors is similar to the identity of that animal read from the RFID system 9, the identity of that animal is then confirmed as the identity of the animal read from the RFID system 9 and stored in the second memory 20 cross-referenced with the identification number of the stall 5 of the platform 3 in which the animal is located. The computed feature vector of that animal is then stored and confirmed as the most recent reference feature vector for that animal in the first memory.

If however the selected predefined number of the possible matching reference feature vectors of that animal do not match the identity of that animal in the stall 5 of that animal, already read from the RFID system 9, then the alarm 22 is activated to produce a conflict alert signal indicating that there is a conflict between the identity of the animal for which the computed feature vector has been computed from the captured image of the animal and the identity of the animal read from the RFID system 9. At this stage, the farmer or supervisor of the milking parlour 1 must resolve the conflict and input the correct identity of the animal through an interface 31 of the apparatus 30. The interface 31 may be a manual interface, or a machine-to-machine interface, and if a manual interface, typically, would be provided by a keyboard, a touch screen or a voice recognition interface. If on the other hand the interface is a machine-to-machine interface, the microprocessor 14 would be configured to read the identity of the animal from a database stored in another computer.

As discussed above the data set of reference feature vectors is updated each time a successful match of a computed feature vector computed from a captured image of an animal is made with the reference feature vector for that animal. Typically, a reference feature vector file is stored in the first memory 17 for each animal within which a predefined number of reference feature vectors are stored for that animal, in a similar manner as a predefined number of reference images are stored in reference image data files for the respective animals in the embodiment of the invention described with reference to FIGS. 1 and 2. As discussed above, each time a computed feature vector from a captured image of an animal is matched with a reference feature vector of one of the animals of the herd, the computed feature vector is added as the most recent reference feature vector to the reference feature vector data file of that animal. Once the predefined number of the reference feature vectors has been stored in the reference feature vector file of each animal, each time a new reference feature vector is added to the reference feature vector file for that animal, the oldest stored reference feature vector, which is not a confirmed reference feature vector is deleted. If all the reference feature vectors stored in the reference feature vector file for that animal are confirmed reference feature vectors, then the oldest confirmed reference feature vector in the reference feature vector file for that animal is deleted.

Turning now to the initial derivation of the data set of the reference feature vectors for the herd of the animals, initially, the data set is built up from one or a few images of animals which may be of one or more of the animals of the herd or may be of animals of similar type to the animals of the herd. As the images of the animals are being sequentially captured, a feature vector comprising the matrix of the metrics is computed from captured images of each animal. The computed feature vector is compared with the stored one or a few stored images, and if no match is found, that computed captured feature vector is stored in the first memory 17 as the reference feature vector for that animal and deemed to be a feature vector of a new animal to the herd, and is cross-referenced with the identity of that animal read from the RFID system 9, and so on until a data set of reference feature vectors for the animals of the herd has been assembled and stored in the first memory 17. During the initial assembly of the data set of the reference feature vectors, the computing and comparison of each feature vector computed from the corresponding captured image is computed and compared with the already stored reference feature vectors in the memory 17 using the neutral network trained by the metric learning model, in order that the metrics are appropriately spaced so that the matrix of the metrics of the feature vector of each animal is distinguishable from the feature vectors of the other animals of the herd. Once a complete data set of the reference feature vectors cross-referenced with the identities of the respective animals read from the RFID system 9 has been stored in the first memory 17, thereafter the identification of the animals as they enter the stalls 5 of the platform 3 is similar to that already described.

Referring now to FIG. 4, apparatus 40 according to another embodiment of the invention for determining the identity of an animal of a herd of animals in a stall of a rotary milking platform, is similar to the rotary milking platform 3 of the milking parlour 1, described with reference to FIGS. 1 and 2. The apparatus 40 according to this embodiment of the invention is substantially similar to the apparatus 30 described with reference to FIG. 3, and similar components are identified by the same reference numerals. The microprocessor 14 of the apparatus 40 is programmed to compute feature vectors, substantially similar to those computed by the microprocessor 14 of the apparatus 30 from images of the animals captured by the camera 15. The microprocessor 14 of the apparatus 40 is programmed to compare the computed feature vectors with reference feature vectors of the animals stored in the first memory 17.

However, in this embodiment of the invention in order to minimise the number of comparisons which have to be made of each computed feature vector with the reference feature vectors of the animals of the herd, and in turn to reduce the time required to determine a best match of the computed feature vector, the reference feature vector of the respective animals are classified into classification groups. The classification groups are structured such that the reference feature vectors of the animals of a classification group, each comprise at least one metric of at least one element of the reference image of the animal from which that reference feature vector is derived, and that at least one element is common to the reference images of the animals of that classification group, and from which the reference feature vectors of the animals of that classification group have been derived. Preferably, the reference feature vectors of a classification group each comprise more than one metric of at least one element, and preferably, more than one metric of more than one element of the reference image of the animal from which that reference feature vector is derived, and that at least one element or more than one element are common to the reference images of the animals of that classification group and from which the reference feature vectors of the animals of that classification group have been derived.

The microprocessor 14 is programmed by the neutral network trained by the metric learning model to initially determine the element or elements of a captured image or images of an animal, from which the metrics of the feature vector for that animal, are to be computed. When the matrix of the metrics of the metrics of feature vector have been computed from the image or images, the microprocessor 14 is programmed to initially search through the classification group of the reference feature vectors which have been computed from a similar element or element to those from which the just computed feature vector has been computed. On a best match of the just computed feature vector with one of the reference feature vector of that classification group of reference feature vectors being determined, or a number of close matches of the computed feature vector with a number of the reference feature vectors, the microprocessor 14 is programmed to continue with determining the identity of the animal as already described with reference to the apparatus 30 of FIG. 3.

On the other hand, if a best match of the computed feature vector with the reference feature vectors of the relevant classification group is not made, or if close matches of the computed feature vector with a number of the reference feature vectors of the relevant classification group are not detected, the microprocessor 14 is programmed to continue the comparison of the computed reference feature vector with the reference feature vectors of the other ones of the classification groups, commencing with the classification group which is closest to the classification group of reference feature vectors already searched. On completion of comparing the computed reference feature vector with the reference feature vectors of all the classification groups, if a best match is not determined, or if a close match of the computed reference feature vector with one or more of the reference feature vectors is not detected, the microprocessor 14 is programmed to continue in accordance with the apparatus 30 described with reference to FIG. 3.

In this embodiment of the invention the comparison of each computed feature vector with the reference feature vectors is carried out by the microprocessor 14 under the control of the neutral network trained by a learning model. The metric learning model ideally comprises a one-shot deep learning model in order to permit the creation of additional reference feature vectors for the corresponding animals to be included in the data files of the respective corresponding animals which are new additions to the herd, on the fly from one or only a few reference images. By using the metric learning model, the metrics of each feature vector are selected and computed from the captured image of that animal such that the computed metrics, which subsequently become the metrics of the reference feature vector for that animal, are distinguishable from the metrics of the reference feature vectors of the other animals of the herd. Ideally, the metric learning model is configured to generate the reference feature vectors of the respective animals in a feature space such that the metrics of the feature vectors of the respective classification groups are spaced sufficiently far apart from each other to allow the reference feature vectors of each animal to be distinguishable from the reference feature vectors of the respective other animals of the herd.

Referring now to FIGS. 5 and 6 there is illustrated a rotary milking parlour according to another embodiment of the invention indicated generally by the reference numeral 50. The milking parlour 50 is substantially similar to the milking parlour 1 described with reference to FIGS. 1 and 2, and similar components are identified by the same reference numerals. The milking parlour 50 comprises apparatus 55 which is substantially similar to the apparatus 40 described with reference to FIG. 4 for determining the identities of animals of a herd of animals in the respective stall 5 of the rotary platform 3 of the milking parlour 50. An RFID animal identifying system 9 which is similar to the RFID animal identifying system 9 of the milking parlour 1, is also provided for determining the identity of each animal entering a stall 5 aligned with the entrance passageway 6 to the platform 3 as already described with reference to the milking parlour 1 of FIGS. 1 and 2.

In addition to the features of the milking parlour 1 of the embodiment of FIGS. 1 and 2, the rotary platform 3 of the milking parlour 50 is provided with feed troughs 58, one feed trough 58 being provided for each stall 5. The feed troughs 58 are located on the platform 3 adjacent the inner ends of the respective stalls 5. A feeding system 60 for supplying diet feeds to the feed troughs 58 of the respective stalls 5 comprises one or more feed sources 62 from which the diet feeds are supplied to the feed troughs 58. Each feed trough 58 is supported on a corresponding load cell 63 for weighting the diet feed in the corresponding feed trough 58. The data indicative of the appropriate diet feeds and the quantities thereof for the respective animals of the herd is stored and cross-referenced in a third storing means, namely, a third memory 64, and is readable by the microprocessor 14. The microprocessor 14 is programmed, so that on the identity of the animal in the stall 5 of the rotary platform 3 being determined as described above, the microprocessor 14 reads the data indicative of the diet feed and the quantity thereof for that animal from the third memory 64, and operates the feeding system 60 to dispense that diet feed and the appropriate quantity thereof into the feed trough 58 of the stall 5 in which that animal is located.

The microprocessor 14 is programmed to read signals from the load cell 63 of each trough 58 when the stall 5 corresponding to that feed trough 58 is aligned with the exit passageway 7 and to determine the weight of feed consumed by the animal exiting that stall 5. The microprocessor 14 is programmed to store the particulars of the diet feed and the weight thereof consumed by each animal in a fourth memory 65 cross-referenced with the identity of the animal date and time stamped with the date and time of the milking cycle during which that diet feed was consumed by that animal.

Additionally, the milk from each stall 5 of the rotary platform 3 is passed through monitoring means, namely, a flow meter 67 and a milk composition analysing device 68, which produce signals indicative of the milk yield from each animal, and the composition of the milk produced by each animal, respectively, on the platform 3. The microprocessor 14 is programmed to read signals from the flow meter 67 of each stall 5 of the platform 3 and to compute the milk yield of each animal on the platform 3 based on the stall 5 in which that animal is located during each milking cycle. The microprocessor 14 is programmed to store the computed milk yield of each animal in the fourth memory 65 cross-referenced with the identity of the animal date and time stamped with the date and time of the milking cycle. The microprocessor 14 is programmed to read signals from the milk composition analysing device 68 of the corresponding stalls 5 and to compute the composition of the milk from each animal during each milking cycle of the animal. The microprocessor 14 is programmed to store the computed composition of the milk of each animal cross-referenced with the identity of the animal date and time stamped with the date and time of the milk cycle in the fourth memory 65.

The microprocessor 14 is programmed to compute a lameness score for each animal from the captured image or images of each animal, for example, from the curvature of the back of the animal and the gait of the animal, with the score increasing from zero in proportion to the degree of lameness of the animal. The value of zero of the lameness score is indicative of an animal which is not lame. The microprocessor 14 is programmed to store the computed lameness score of each animal in the fourth memory 65 cross-referenced with the identity of the animal date and time stamped with the date and time of the milking cycle.

In this embodiment of the invention reference auxiliary characteristics of each animal of the herd are stored in the first memory 17 cross-referenced with the identity of the corresponding animal. The reference auxiliary characteristics of the animals which are stored in the first memory 17 are reference milk yields, reference milk compositions, reference weights of feed which should be consumed and reference lameness scores of the respective animals.

The microprocessor 14 is programmed at the end of each milking cycle of each animal to compare the computed milk yield, the computed milk composition, the computed weight of feed and the computed lameness score of that animal for that milking cycle with the reference milk yields, the reference milk compositions, the reference weights of feed and the reference lameness scores, respectively, for that animal stored in the first memory 17. If the just computed milk yield, the just computed milk composition, the just computed weight of feed consumed and the just computed lameness score match the more recent reference milk yields, reference milk compositions, reference weights of feed and reference lameness scores, respectively, for that animal, the identity of the animal is confirmed. If there is a large discrepancy between any one of the computed milk yield, milk composition, weight of feed consumed and lameness score of an animal and the more recent reference milk yields, the reference milk compositions, reference weights of feed and the reference lameness scores, respectively, of that animal, a conflict alert signal is produced alerting to the discrepancy, so that the identity of the animal determined from the computed feature vector of that animal and the identity determined by the RFID animal identification system 9 may be further checked.

The microprocessor 14 may also be programmed to determine the identities of the animals by comparing the computed auxiliary characteristics of each animal, namely, the computed milk yield, the computed milk composition, the computed weight of feed consumed and the computed lameness score of that animal with the corresponding reference auxiliary characteristics of all the animals of the herd until a best match is found of the computed auxiliary characteristics with the reference auxiliary characteristics. The identity of that animal would then be determined as the identity of the animal, the reference auxiliary characteristics of which matched or were closest to the computed auxiliary characteristics. The microprocessor 14 would be programmed to carry out the comparisons of the computed auxiliary characteristics with the reference auxiliary characteristics to determine the best match or those reference auxiliary characteristics which are closest to the computed auxiliary characteristics in a similar manner as the microprocessor 14 is programmed to compare the computed feature vector or computed feature vectors of each animal with the reference feature vectors, in order to find the best match or the reference feature vectors which are closest to the computed feature vector or vectors.

Additionally, the microprocessor 14 would be programmed to compare the identity determined for each animal from the computed auxiliary characteristics with the identities determined for that animal from the computed feature vector of that animal and from the RFID animal identifying system. If the three determined identities matched, the identity determined for that animal would be confirmed. If one or more of the determined identities did not match with the other or others, a conflict signal would be produced, in order to allow the identity of that animal to be further investigated as already described.

The microprocessor 14 is programmed to store reference auxiliary characteristics in the first memory 17. Initially, on the first milking cycle to which each animal is subjected on the rotary milking platform 3 of the milking parlour, there will be no reference auxiliary characteristic stored for that animal. At the end of the first milking cycle of each animal, and when the identity of that animal has been confirmed, and the milk yield, the milk composition, the weight of feed consumed and the lameness score of that animal have been computed, the computed milk yield, the computed milk composition, the computed weight of feed consumed and the computed lameness score of that animal are stored in the first memory 17 cross-referenced with the identity of that animal as a reference milk yield, a reference milk composition, a reference weight of feed consumed and a reference lameness score for that animal. The microprocessor 14 is configured to store a predefined number of each of the reference auxiliary characteristics for each animal in the first memory 17. In this case, the predefined number of each of the reference auxiliary characteristics is ten of each of the reference auxiliary characteristics for each animal. At the end of each milking cycle, once the identity of each animal has been confirmed, the computed milk yield, the computed milk composition, the computed weight of feed consumed and the computed lameness score for that animal are stored by the microprocessor 14 as the most recent reference milk yield, the most recent reference milk composition, the most recent weight of feed consumed and the most recent reference lameness score for that animal in the first memory 17 cross-referenced with the identity of that animal date and time stamped. On the number of each reference auxiliary characteristic stored for each animal reaching the predefined number of ten, when the next computed one of the milk yield, the milk composition, the weight of feed consumed and the lameness score for that animal is being stored in the first memory 17 as the next most recent reference milk yield, milk composition, weight of feed consumed and lameness score, respectively, the oldest one of the reference milk yield, the reference milk composition, the reference weight of feed consumed and the reference lameness score, respectively, for that animal is deleted from the first memory 17.

It is also envisaged that the reference auxiliary characteristics may be classified into classification groups in a somewhat similar manner as described with reference to the classification of the reference feature vectors into classification groups. In classifying the reference auxiliary characteristics into classification groups, it is envisaged that animals which produced milk yields within respective predefined volume ranges would be classified into classification groups by their milk yields. Similarly the milk compositions of the respective animals could be classified into predefined ranges whereby specific critical components of the milk composition were within respective predefined percentage ranges, and the animals would be classified into the appropriate group based on the composition of their milk. In the case of the reference weights of feed consumed by the animal, the animals would be classified into classification groups of predefined ranges of weights of feed consumed. Similarly, in the case of lameness scores, the animals would be classified into classification groups of respective ranges of lameness score.

The farmer or other authorised user can access the stored data relating to the respective animals stored in the first, second, third and fourth memories 17, 20, 64 and 65 of the apparatus 55 and the milking parlour 50.

Otherwise, the milking parlour 50 is similar to the milking parlour 1, and the operation of the apparatus 55 and the RFID animal identification system 9 and their operation are similar to the apparatus 40 and 50 described with reference to FIGS. 3 and 4.

While the apparatus 55 has been described as storing reference auxiliary characteristics, while this is desirable, it is not essential. Additionally, it will be appreciated that while the reference auxiliary characteristics have been described as comprising specific characteristics, any other suitable reference auxiliary characteristics may be computed and stored. Needless to say, while the milk yield, the milk composition, the weight of feed consumed and lameness score of each animal have been described as being computed and stored as reference auxiliary characteristics, it will be appreciated that only one or two of these auxiliary characteristics may be computed, and only one, some, or all of these auxiliary characteristics of the animals may be stored as reference auxiliary characteristics. For example, it is envisaged that the reference auxiliary characteristics may only comprise milk yield and milk composition. Alternatively, the reference auxiliary characteristics may comprise milk yield, milk composition and weight of feed consumed. In another case, the reference auxiliary characteristics may comprise milk yield and lameness score only or milk yield and weight of feed consumed only, or a combination of milk yield, weight of feed consumed and lameness score. In other cases, it is envisaged that the reference auxiliary characteristics may comprise only milk composition, weight of feed consumed and lameness score, while in other embodiments, the reference auxiliary characteristics may comprise weight of feed consumed and lameness score only, or milk composition and lameness score only. While in other embodiments, it is envisaged that the reference auxiliary characteristics may comprise milk composition and weight of feed consumed only.

Needless to say, any other combination of two or more of milk yield, milk composition, weight of feed consumed and lameness score could be used as reference auxiliary characteristics.

While the apparatus for determining the identity of an animal has been described for use in a milking parlour comprising a rotary platform, the apparatus may be used in any milking parlour, be it a milking parlour comprising a rotary platform or any other type of milking parlour, for example, a milking parlour, in which the stalls are arranged side by side in elongated rows, or in a herring-bone lay-out. In the case of such milking parlours, it is envisaged that an image capturing device will be provided adjacent each stall of the milking parlour, or alternatively, a single camera may be located at an entry point of the parlour, at which the order in which the animals enter the respective stalls is determined, and will not change.

It is also envisaged that the apparatus for determining the identity of an animal may be used for determining the identity of an animal at any location other than in or adjacent a stall of a milking parlour. For example, the apparatus may be provided for determining the identity of an animal in a drafting crate, in a single stall milking apparatus or at any other location.

It will also be appreciated that while the image capturing device has been described as a particular type of camera, the camera may be of any other suitable type, but ideally, would be capable of producing a digital electronic signal indicative of the captured images.

It will also be appreciated that while a single camera has been described, in some embodiments of the invention it is envisaged that a number of cameras may be provided for capturing images of the animal from different angles, and some or all of the captured images of the animal from the respective different angles would be compared with corresponding reference images of the respective animals of the herd stored in the first memory.

It is also envisaged that in the embodiment of the apparatus 12 described with reference to FIG. 2, the microprocessor 14 may be programed to carry out the image recognition function of the image recognition element 19, and in which case, the image recognition element 19 may be dispensed with. It is also envisaged that the reference images and/or the reference feature vectors may be stored in a memory configured in the microprocessor, and it is also envisaged that the data stored in the second memory could also be stored in a memory configured in the microprocessor, as could the data stored in the third and fourth memories be stored in memory of the signal processor.

While the apparatus according to the invention has been described for use in a milking parlour, it is envisaged that the apparatus may also be used in a single stall milking apparatus. In which case, it is envisaged that the camera would be located in the single stall milking apparatus, for example, in the stall at a level above the animal, and preferably, forwardly of the animal, and the RFID system would be located outside the entrance to the stall of the milking apparatus but adjacent to the entry to the stall. The apparatus according to the invention may also be used in conjunction with a straight milking parlour.

While the RFID animal identifying system has been described as identifying an animal as it enters a stall of a milking parlour, it is envisaged that the RFID animal identifying system may be located in any suitable location, where it would identify an animal at any suitable or desired location, it is envisaged that in certain cases the RFID animal identifying system may be located in order to identify the animal in the stall, and in which case, it is envisaged that the reader part of the RFID animal identifying system would be located in the stall, adjacent the stall or indeed, adjacent the image capturing device. It is envisaged that in some embodiments of the invention the independent animal identifying system may be omitted While the image capturing device has been described as being provided in a specific location relevant to each stall, it will be readily apparent to those skilled in the art that the image capturing device may be located in any suitable location in the stall and the location of the image capturing device will depend on the area of the animal of which the image is to be captured and will also depend on the nature of the feature vector to be computed for each animal.

It will of course be appreciated that the image capturing device or devices may be activated at any time while the animal is in the stall, and the apparatus for determining the identity of the animal may be activated at any time for determining the identity of the animal after the image or images of the animal have captured. Needless to say the apparatus for determining the identity of the animal from the captured image or images thereof may be located remotely of the milking parlour or the single stall milking apparatus, and may be located in a remotely located computer, for example, in a cloud computer.

It will also be appreciated that while the feature vectors computed from the captured image or images have been described as comprising a matrix of metrics, in some embodiments of the invention, each feature vector may comprise a single metric or only a few metrics. Needless to say the metric or metrics of each reference vector may be derived from any suitable element or elements, the size, shape, position, colour or any other aspect thereof would serve to distinguish one animal from another animal.

It is envisaged that in many embodiments of the invention in order to compute the matrix of metrics of each feature vector, many images of an animal will be required to be captured of that animal, and in some embodiments of the invention the captured images will be required to be captured video clips. It is envisaged that a captured video clip or captured video clips of each animal would be required in order to enable a lameness score to be computed, particularly if the lameness score is based on the gait of the animal.

The invention claimed is:

1. A method for determining the identities of animals of a herd of animals, the method comprising:
    storing a plurality of reference images or reference feature vectors of the respective animals of the herd cross-referenced with the identities of the animals,
    capturing an image of at least a part of the animal to be identified with an image capturing device,
    comparing the captured image or a feature vector computed from the captured image with the stored reference images or the stored reference feature vectors until a best match is detected matching the captured image with one of the reference images, or matching the computed feature vector with one of the reference feature vectors, and determining the identity of the animal based on the best match,
    independently determining the identity of the animal of the herd, the identity of which has been determined based on the best match, by an independent identifying system comprising a radio frequency based identifying system,
    comparing the identity of that animal determined based on the best match with the identity of that animal determined by the independent identifying system, and
    if the two determined identities of that animal are of the same animal, storing the captured image or the computed feature vector of that animal as a confirmed reference image or a confirmed reference feature vector of that animal.

2. A method as claimed in claim 1 in which the reference images of the respective animals are stored in electronic form, and the captured image is compared sequentially with each of the reference images until the best match has been identified.

3. A method as claimed in claim 1 in which if the identity of the one of the animals identified by the comparison of the captured image with the reference image for that animal is different to the identity determined by the independent identifying system for that animal, a conflict alert signal is produced, altering to the conflict between the two determined identities of that animal.

4. A method as claimed in claim 1 in which the reference feature vectors for the respective animals of the herd are unique to each one of the respective animals.

5. A method as claimed in claim 4 in which the reference feature vectors are stored in a data set comprising the reference feature vectors of the respective animals of the herd, and the reference feature vector of each animal comprises at least one metric of an element derived from a reference image of that animal.

6. A method as claimed in claim 5 in which the reference feature vector of each animal comprises a matrix comprising a plurality of metrics of that animal, and each metric of the matrix of metrics of each animal is computed from the reference image of that animal, and stored in digital form, and each metric of each animal is computed from the digital form of the reference image of that animal.

7. A method as claimed in claim 5 in which each captured image is passed through a learning model, and the learning model computes the corresponding feature vector from the captured image.

8. A method as claimed in claim 7 in which the learning model comprises a one-shot deep learning model for permitting the creation and the inclusion of a new reference feature vector of a new animal added to the herd to be added to the learning model on the fly.

9. A method as claimed in claim 7 in which the learning model is based on metric learning, the metric learning model being configured to generate reference feature vectors of the respective animals of the herd in a feature space, such that the metrics are spaced apart sufficiently from each other in order to allow the reference feature vector of each animal to be distinguishable from the reference feature vectors of the respective other animals of the herd.

10. A method as claimed in claim 1 in which the reference feature vectors of groups of the animals of the herd are classified into respective classification groups of reference feature vectors, whereby at least one metric of the reference feature vector of each of the animals of each classification group comprise a metric of an element of the reference image of that animal of that classification group which is an element common to the reference images of the animals of that classification group, and on each computed feature vector being computed from a just captured image of an animal, the classification group of the reference feature vectors of the animals to which the computed feature vector is closest is determined, and the computed feature vector is compared with the reference feature vectors of that classification group until a best match of the computed feature vector with one of the reference feature vectors of that classification group is detected.

11. A method as claimed in claim 10 in which if a best match of the computed feature vector computed from the just captured image with the reference feature vectors of the determined closest classification group of reference feature vectors is not identified, the computed feature vector is compared with the reference feature vectors of the other classification groups until a best match with one of the reference feature vectors is determined.

12. A method as claimed in claim 1 in which each time a match is not found for a computed feature vector computed from a just captured image of an animal, that computed feature vector is deemed to be a feature vector of a new animal, and is stored as a reference feature vector of the new animal, and a new animal alert signal is produced indicating that a new animal has been detected, and that the identity of the new animal is to be cross-referenced with the stored reference feature vector of that new animal.

13. A method as claimed in claim 1 in which at least some of the reference images of each animal comprise an image of one or more of the head, the ears, the rump, the shoulders or the tail of each animal.

14. A method as claimed in claim 1 in which the image capturing device is located above the animal in or adjacent a stall of a milking parlour or a single stall milking apparatus, and the independent identifying system is configured to determine the identity of the animal as the animal is entering the one of the milking parlour, the stall of the one of the milking parlour and the single stall milking apparatus.

15. A method as claimed in claim 14 in which one or more of the milk yield, the milk composition, the milk let down and the milking time are monitored of each animal during a milking cycle of that animal and stored cross-referenced with the identity of the animal.

16. A method as claimed in claim 1 in which a plurality of reference images of each one of the respective animals is stored in electronic form, and the captured image is compared using a statistical sampling best match method with the reference images sequentially until the best match has been identified.

17. A method as claimed in claim 16 in which each reference image comprises a two-dimensional image of the corresponding animal, a three-dimensional image of the corresponding animal, a two-dimensional image of the animal captured in the image, or a three-dimensional image of the animal captured in the image.

18. A method as claimed in claim 16 in which not more than a predefined number of reference feature vectors are stored for each animal, and the reference feature vectors of each animal are updated each time a computed feature vector of a just captured image of that animal is matched with a reference feature vector of that animal, and the computed feature vector from the just computed image of that animal is stored as a reference feature vector of that animal with the other stored reference feature vectors of that animal, and each time the number of reference feature vectors stored for each animal exceeds the predefined number of stored feature vectors, the oldest stored reference feature vector which is not a confirmed reference feature vector is deleted from the stored reference feature vectors, and if all the reference feature vectors stored for that animal are confirmed reference feature vectors, the oldest one of the confirmed reference feature vector is deleted.

19. A method as claimed in claim 1 in which the reference images of the respective animals of the herd comprise images of similar parts of the respective animals.

20. Apparatus for determining the identity of an animal of a herd of animals, the apparatus comprising:
   an electronic memory for storing a plurality of reference images or reference feature vectors of the respective animals of the herd cross-referenced with the identities of the respective animals,
   an image capturing device for capturing an image of at least a part of an animal,
   a first comparing means for comparing the captured image of the animal with the reference images stored in the electronic memory or for comparing the computed feature vector with the reference feature vectors stored in the electronic memory until a best match is detected matching the captured image with one of the reference images, or matching the computed feature vector computed from the captured image with one of the reference feature vectors,
   a means for determining the identity of the animal based on the best match,
   an independent identifying system comprising a radio frequency based identifying system for determining the identities of the respective animals of the herd independently of the means for determining the identities of the animals based on the best match,
   a second comparing means for comparing the identity of each animal identified based on the best match with the identity of that animal determined by the independent identifying system, and
   a means for storing the captured image or the computed feature vector of that animal in the electronic memory as a confirmed reference image or a confirmed reference feature vector for that animal if the two determined identities are of the same animal.

* * * * *